(12) United States Patent
Ide

(10) Patent No.: US 7,440,690 B2
(45) Date of Patent: Oct. 21, 2008

(54) FOCUS DETECTION APPARATUS AND CONTROL METHOD THEREOF

(75) Inventor: Masataka Ide, Hachioji (JP)

(73) Assignee: Olympus Corporation, Tokyo (JP)

( * ) Notice: Subject to any disclaimer, the term of this patent is extended or adjusted under 35 U.S.C. 154(b) by 374 days.

(21) Appl. No.: 11/288,965

(22) Filed: Nov. 29, 2005

(65) Prior Publication Data

US 2006/0133792 A1    Jun. 22, 2006

(30) Foreign Application Priority Data

Nov. 30, 2004   (JP)   ............... 2004-346683

(51) Int. Cl.
*G02B 7/28* (2006.01)
*G03B 3/10* (2006.01)
*G03B 13/00* (2006.01)
*H04N 5/232* (2006.01)

(52) U.S. Cl. ............... 396/111; 396/121; 396/123; 396/125; 348/345; 348/350; 348/353; 348/354; 348/356

(58) Field of Classification Search ............... 396/102, 396/104, 111, 121, 123, 125, 127, 128, 272, 396/273; 348/345, 349, 350, 353, 354, 356
See application file for complete search history.

(56) References Cited

U.S. PATENT DOCUMENTS

| 6,430,370 | B1* | 8/2002 | Nonaka ............... 396/89 |
| 6,606,322 | B2* | 8/2003 | Mitchem et al. ....... 370/395.31 |
| 6,822,801 | B2* | 11/2004 | Yahagi et al. ........... 359/634 |
| 2002/0097995 | A1* | 7/2002 | Nakata et al. ........... 396/104 |
| 2004/0140981 | A1* | 7/2004 | Clark ..................... 345/600 |
| 2004/0202461 | A1* | 10/2004 | Nakahara ............... 396/104 |

* cited by examiner

*Primary Examiner*—Melissa Jan Koval
(74) *Attorney, Agent, or Firm*—Straub and Pokotylo; John C. Pokotylo

(57) ABSTRACT

An output from an auto focus sensor is converted into a digital signal by an A/D converting section, and an output from the A/C converting section is stored in a memory section. Further, a second AF arithmetic section is used to concurrently execute a plurality of focus detection arithmetic operations based on data in the memory section.

11 Claims, 28 Drawing Sheets

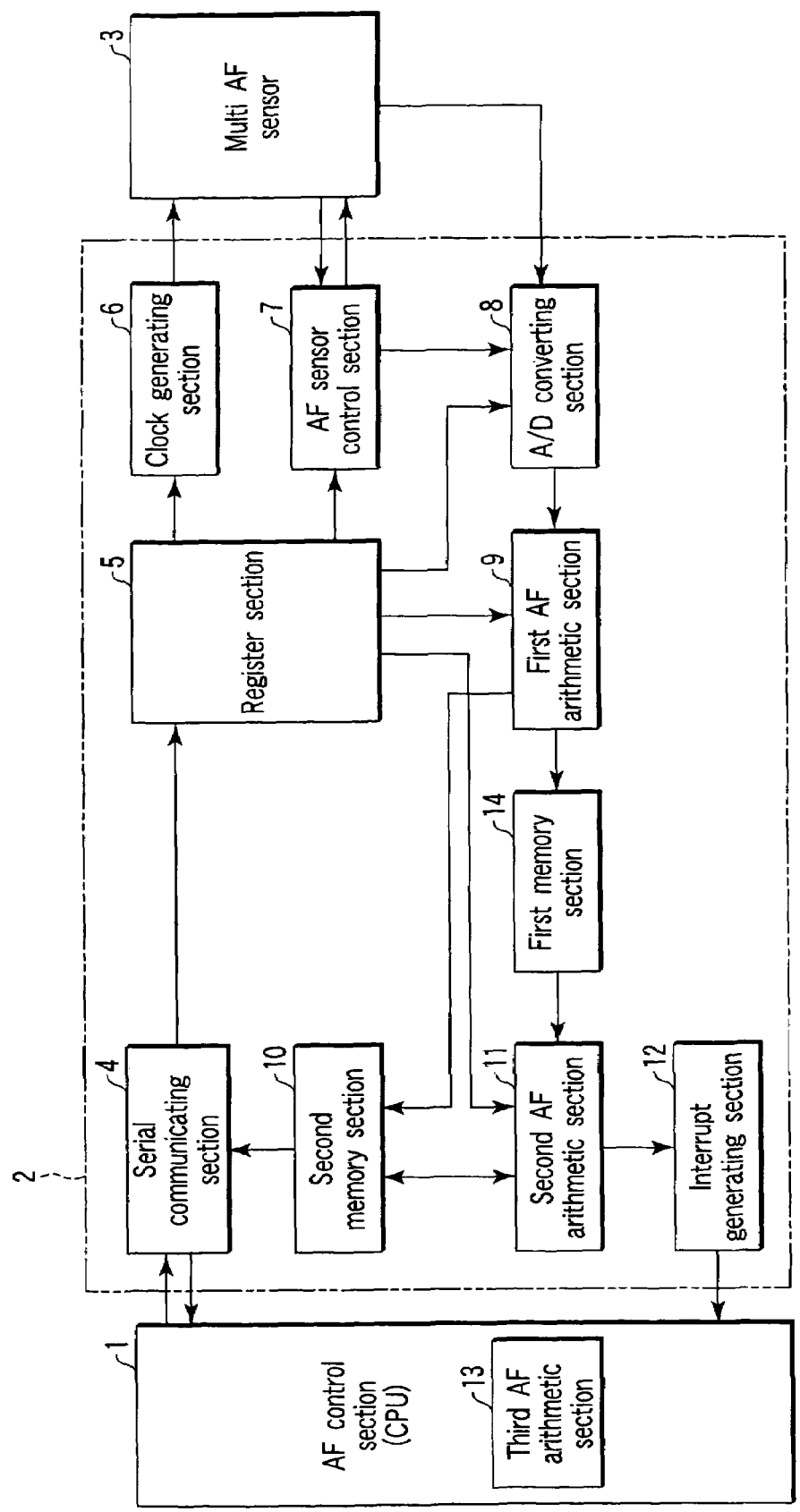
F I G. 3

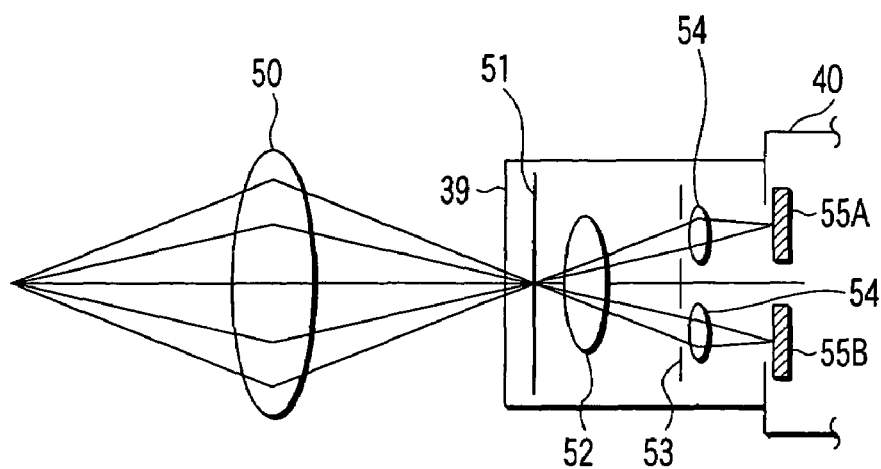
F I G. 5
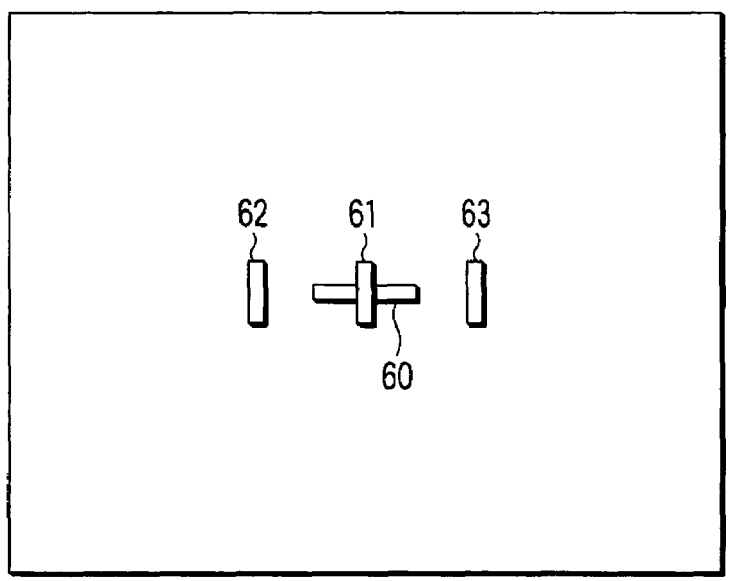
F I G. 6

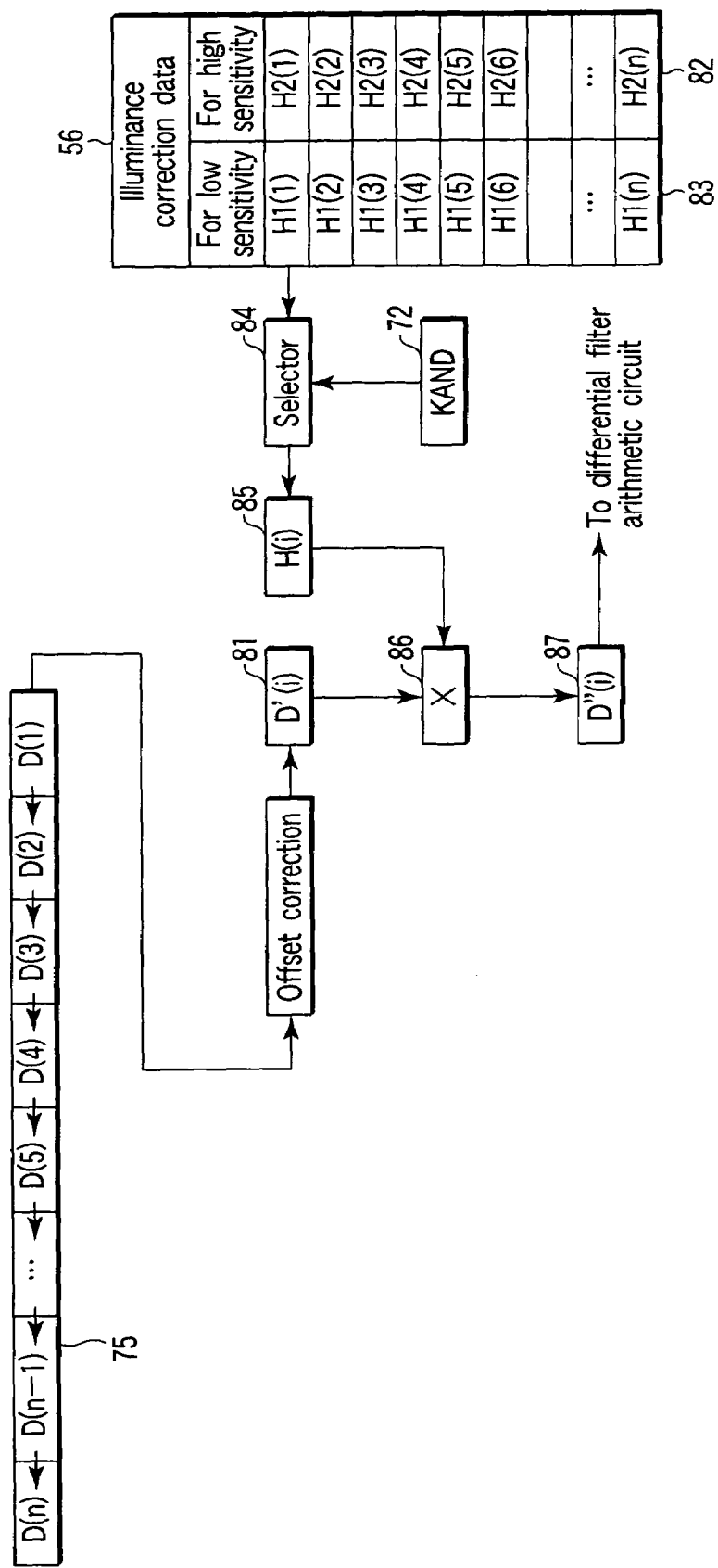
F I G. 17

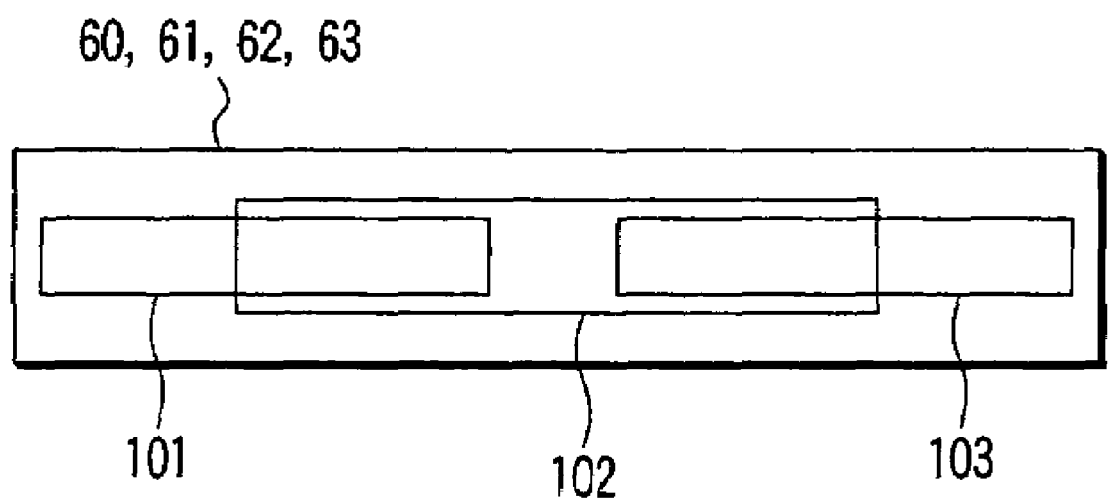
F I G. 20

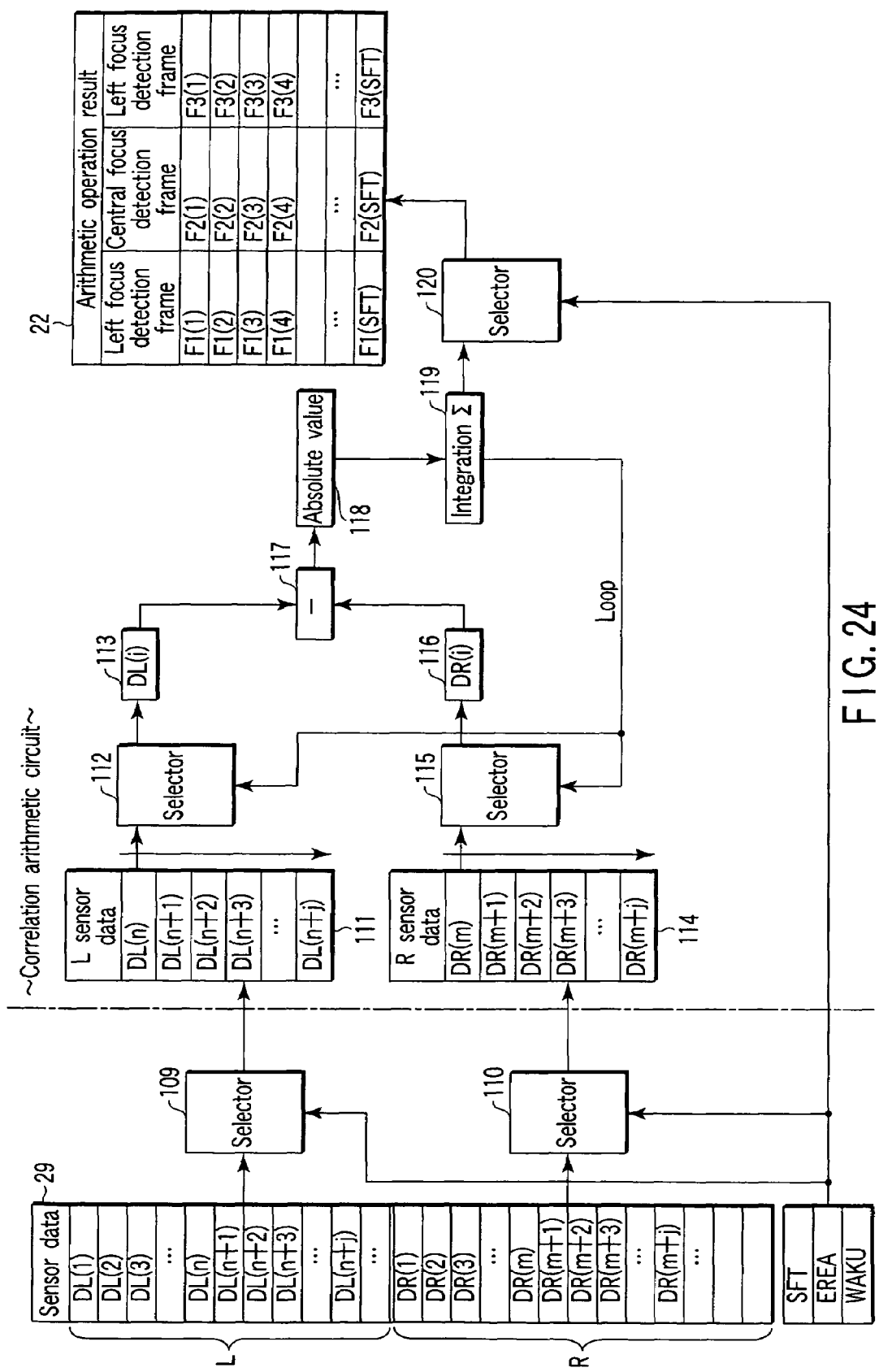
F I G. 24

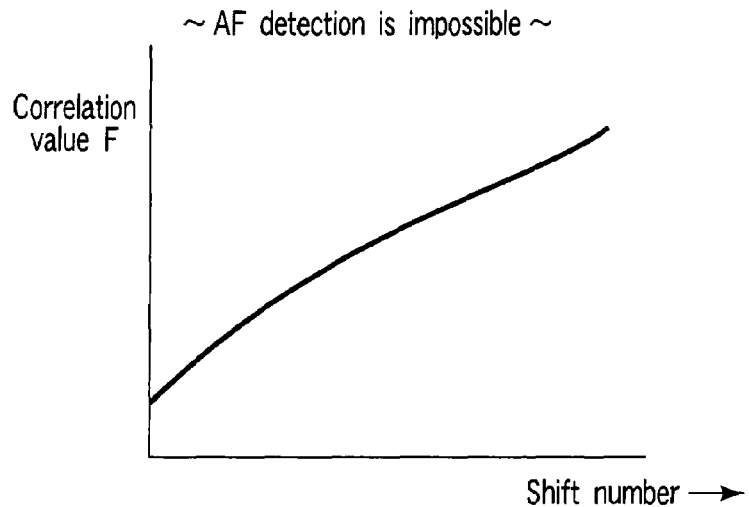
F I G. 34
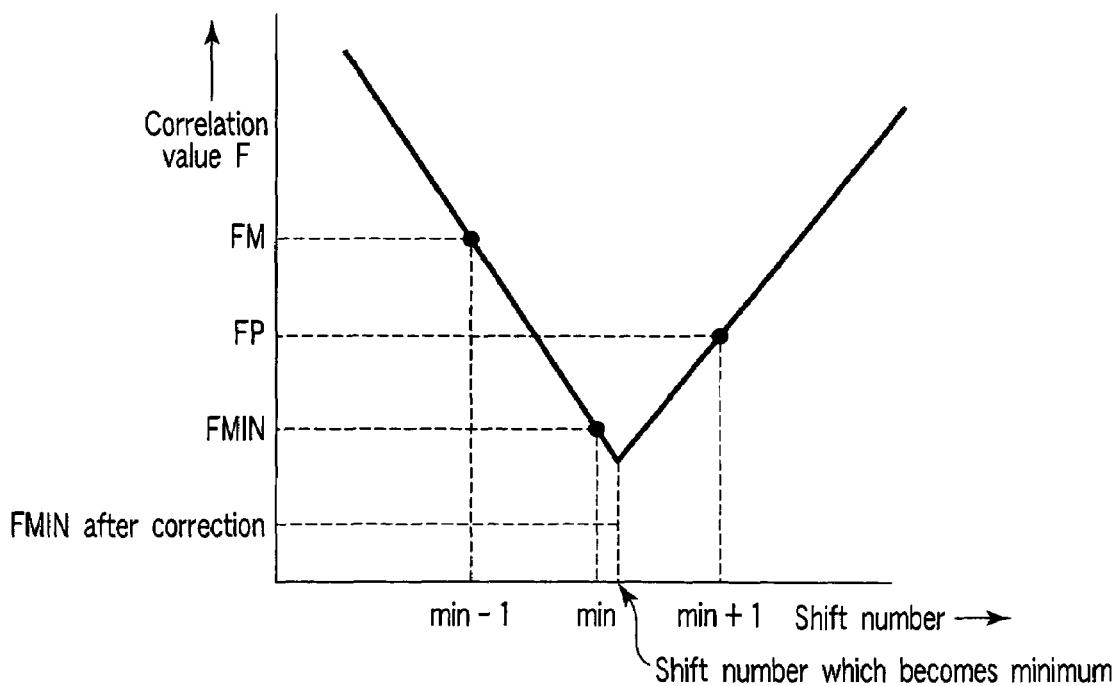
F I G. 35

FOCUS DETECTION APPARATUS AND CONTROL METHOD THEREOF

CROSS-REFERENCE TO RELATED APPLICATIONS

This application is based upon and claims the benefit of priority from prior Japanese Patent Application No. 2004-346683, filed Nov. 30, 2004, the entire contents of which are incorporated herein by reference.

BACKGROUND OF THE INVENTION

1. Field of the Invention

The present invention relates to a focus detection apparatus which performs a camera focus detection arithmetic operation at a high speed, and a control method thereof.

2. Description of the Related Art

There is a TTL phase difference automatic focus detection (auto focus; AF) scheme which leads a light beam transmitted through a shooting lens onto a pair of photoelectric conversion elements and executes a focus detection arithmetic operation based on an output from each photoelectric conversion element to detect a defocus quantity of the shooting lens. This scheme is generally often adopted in a single-lens reflex camera.

Further, multi AF having a plurality focus detection frames is often adopted in recent single-reflex camera, and the number of range finding points is increased.

Therefore, the focus detection arithmetic operation takes time in the arithmetic operation itself. Furthermore, since the number of range finding points is increased, the focus detection arithmetic operation requires a time in units of several-ten ms until the arithmetic operation is completed with respect to all focus detection frames. This leads to an increase in a time lag.

Generally, a focus detection algorithm is configured by using various kinds of arithmetic operation commands (computer programs) of a microcomputer, and the focus detection arithmetic operation is executed based on this focus detection algorithm. In order to reduce a time required for this focus detection arithmetic operation, a speed of an operation clock of the microcomputer is increased, or a high-performance microcomputer is used. However, such an increase in a speed or performance has a limit.

BRIEF SUMMARY OF THE INVENTION

A focus detection apparatus according to one aspect of the present invention comprises:

an auto focus sensor which receives reflected lights from an object at a plurality of light receiving sections and photoelectrically converts the received lights;

a converting section which converts sensor data output from each light receiving section into a digital signal;

a memory section which stores each sensor data converted by the converting section;

a plurality of arithmetic sections which concurrently execute a plurality of types of arithmetic operations which determines whether an object image is focused, a focal point of the reflected based each sensor data stored in the memory section; and a control section which adjusts determines whether the object image is focused, the focal point of the reflected based on arithmetic operation results of the respective arithmetic operation sections.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 3 is a view showing a configuration of an embodiment;

FIG. 5 is a view showing a configuration of an AF optical system and an AF sensor depicted in FIG. 4;

FIG. 6 is a view showing a configuration of a multi AF sensor according to an embodiment;

FIG. 17 is a view showing an operation of hardware of an illuminance correction circuit in an embodiment;

FIG. 20 is a view showing a plurality of focus detection frames set on each sensor array in an embodiment;

FIG. 24 is a view showing an operation of hardware of a correlation arithmetic circuit in an embodiment;

FIG. 34 is a view showing how to obtain an extreme value (a minimum value) of a correlation value and its point of a correlation arithmetic operation result in an embodiment; and FIG. 35 is a view showing a shift number which provides a true minimum value obtained in each embodiment.

DETAILED DESCRIPTION OF THE INVENTION

An embodiment according to the present invention will now be described hereinafter with reference to the accompanying drawings.

Figure 1:
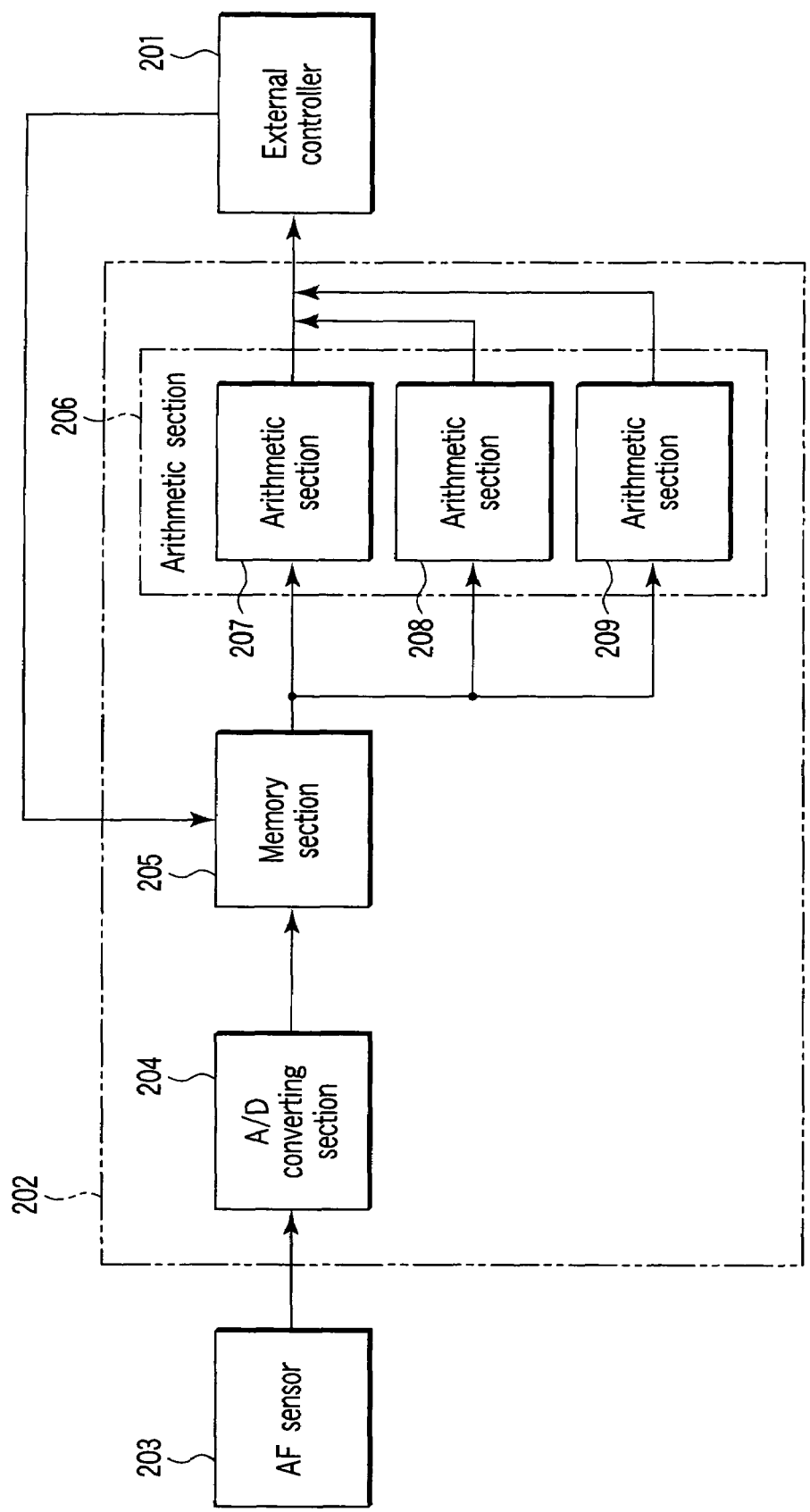
FIG. 1 is a view showing a concept of the present invention.

First, FIG. 1 shows a concept of the present invention.

Reference numeral 201 denotes an external controller; 202, an arithmetic integrated circuit; and 203, an auto focus sensor (which will be referred to as an AF sensor). The arithmetic integrated circuit 202 has an analog/digital converting section (which will be referred to as an A/D converting section) 204, a memory section 205, and an arithmetic section 206. The external controller 201 controls operations of the arithmetic integrated circuit 202 and the AF sensor 203.

An operation will now be described hereinafter.

Sensor data (an analog signal) output from the AF sensor 203 is converted into a digital signal by the A/D converting section 204. This A/D-converted sensor data is stored in the memory section 205. The arithmetic section 206 reads the sensor data stored in the memory section 205 to execute a focus detection arithmetic operation, and has a plurality of arithmetic sections 207, 208 and 209. These arithmetic sections 207, 208 and 209 simultaneously acquire sensor data, and concurrently execute their arithmetic operations.

By executing a plurality of arithmetic operations in a concurrent manner rather than a time-sharing manner, an arithmetic operation time can be greatly reduced.

An arithmetic operation result of the arithmetic section 206 is supplied to the external controller 201. The external controller 201 performs remaining focus detection arithmetic operations based on the arithmetic operation result of the arithmetic section 206 to execute a focus adjustment operation.

Figure 2:
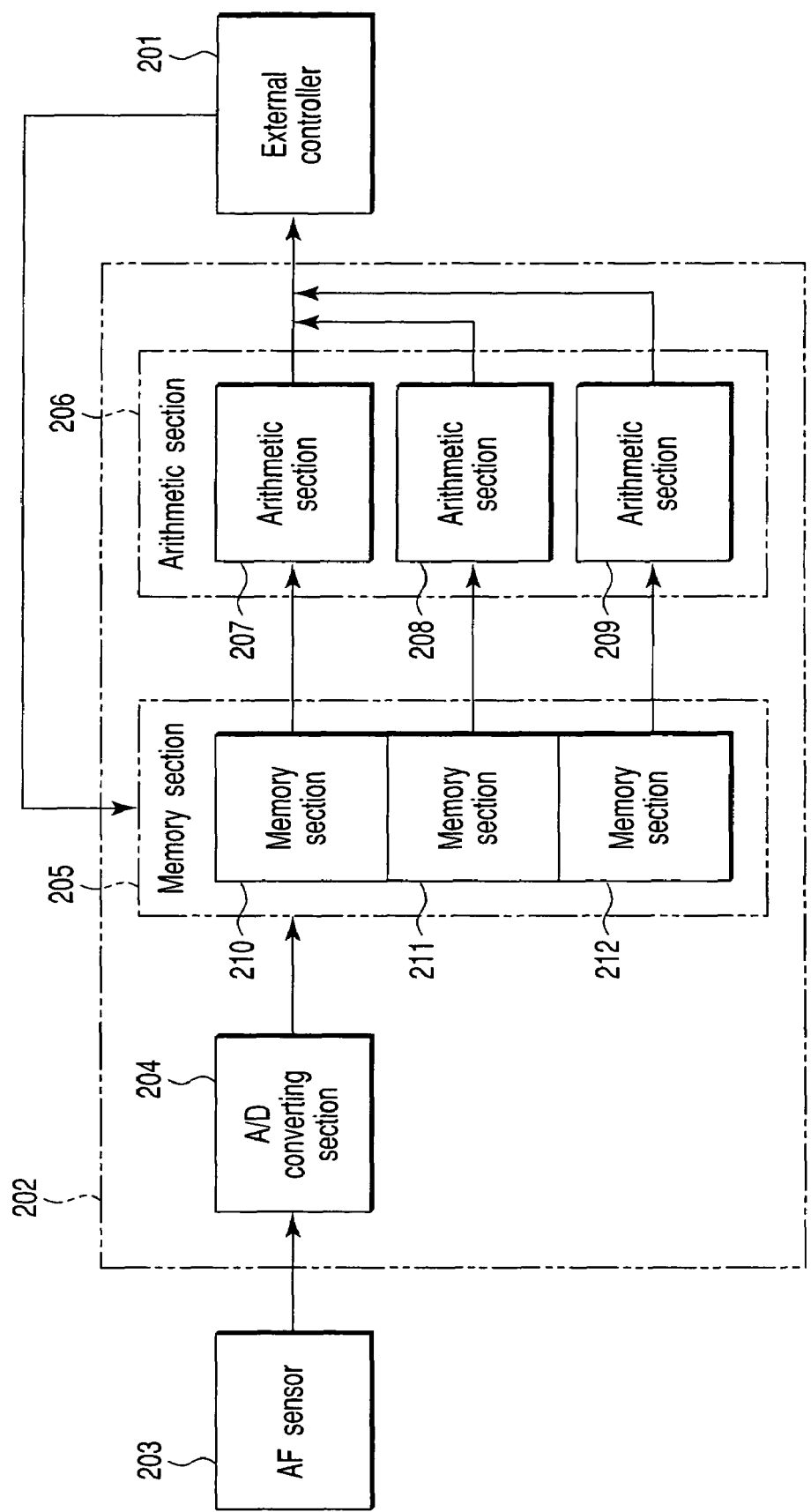
FIG. 2 is a view showing the concept of the present invention in more detail than FIG. 1.

FIG. 2 shows a concept of the present invention in more detail than FIG. 1.

The memory section 205 has a plurality of memory sections 210, 211 and 212. These memory sections 210, 211 and 212 store a plurality of sets of sensor data different from each other, or a plurality of sets of sensor data which partially overlap each other, or a plurality of sets of sensor data equal to each other of sensor data from the A/D converting section 204. Any other structure is the same as that in FIG. 1, thereby eliminating its explanation.

The memory sections 210, 211 and 212 output data to the arithmetic sections 207, 208 and 209 in the arithmetic section 206. The arithmetic sections 207, 208 and 209 simultaneously acquire data from the memory sections 210, 211 and 212, and concurrently execute a plurality of sets of arithmetic operations, i.e., so-called focus detection arithmetic operations required to detect determines whether an object image is focused, a focal point of reflected.

By executing the plurality of types of focus detection arithmetic operations in a concurrent manner rather than a time-sharing manner in this way, an arithmetic operation time can be greatly reduced.

A concrete configuration of the present invention will now be described hereinafter with reference to FIG. 3.

Reference numeral 1 denotes an AF control section (controlling means) which performs entire AF control, has a microcomputer (a CPU) mounted therein, and corresponds to the external controller 201. Reference numeral 2 designates an arithmetic integrated circuit which is controlled by the AF control section 1 to control a multi AF sensor 3 and execute some of AF arithmetic operations, and corresponds to the arithmetic integrated circuit 202. Reference numeral 3 denotes a multi auto focus sensor (which will be referred to as a multi AF sensor) having a plurality of focus detection frames, and corresponds to the AF sensor 203.

A flow of focus detection will now be described hereinafter.

The AF control section 1 sets a value of a register section 5 through a serial communicating section 4. This register section 5 sets various kinds of parameters concerning control of the multi AF sensor 3 and AF arithmetic operations.

A clock having a frequency value set in the register section 5 is supplied from a clock generating section 6 to the multi AF sensor 3. This clock generating section 6 generates a source oscillation clock which is used to drive the multi AF sensor 3.

The multi AF sensor 3 has a plurality of light receiving sections. These light receiving sections are constituted of columns of photoelectric conversion elements. An AF sensor control section 7 executes control over an electric charge storage operation (an integral operation) or control for reading an electric charge storage state of each photoelectric conversion element in the multi AF sensor 3 in accordance with set parameter values in the register section 5. That is, the AF sensor control section 7 is a sequencer which generates a predetermined pulse required to control the multi AF sensor 3.

The multi AF sensor 3 operates in accordance with control of the AF sensor control section 7, and outputs its integration result (an analog value) as sensor data after termination of the integration operation. This sensor data is output to an A/D converting section (converting means) 8 in accordance with each pixel. The A/D converting section 8 converts the sensor data which is sequentially input in accordance with each pixel into a digital value, and supplies the obtained value to a first AF arithmetic section 9 provided on a subsequent stage.

As the AF arithmetic means, three sections, i.e., the following first AF arithmetic section 9, second AF arithmetic section 11 and third AF arithmetic section 13 are prepared.

First, the first AF arithmetic section 9 executes a later-described arithmetic operation with respect to sensor data supplied in accordance with each pixel. Every time the A/D converting section 8 outputs sensor data for one pixel, this arithmetic operation is executed with respect to this pixel output. Therefore, since the arithmetic operation is carried out while performing A/D conversion, an increase in a time lag due to execution of the arithmetic operation by the first AF arithmetic section 9 which affects an entire camera is very small. An arithmetic operation result of the first AF arithmetic section 9 is stored in a second memory section 10, and also supplied to a first memory section 14. The first memory section 14 corresponds to the memory section 205 depicted in FIGS. 1 and 2.

The second memory section 10 stores all arithmetic operation results of the AF sensor control and an AF arithmetic IC 2. Arithmetic operation results in this second memory section 10 can be read to the AF control section 1 through the serial communicating section 4.

The second AF arithmetic section 11 corresponds to the arithmetic section 206 (the arithmetic sections 207, 208 and 209) shown in FIGS. 1 and 2, simultaneously acquires an output from the first AF arithmetic section 9 in a plurality of arithmetic sections, and concurrently executes a plurality of types of focus detection arithmetic operations in these arithmetic sections. One of the plurality of types of focus detection arithmetic operations is a correlation arithmetic operation which calculates a correlation degree of outputs from a pair of light receiving sections in the multi AF sensor 3. This correlation arithmetic operation is not executed in the AF control section 1 because carrying out this arithmetic operation in the AF control section 1 prolongs an arithmetic operation time, but it is executed in the second AF arithmetic section 11 constituted of hardware in order to reduce a time lag which affects the entire camera. That is, the first AF arithmetic section 9 and the second arithmetic section 11 are hardware constituted of an adder, a subtracter, a multiplier and others. An arithmetic operation result of the second AF arithmetic section 11 is stored in the second memory section 10.

The second arithmetic section 11 also performs an arithmetic operation which judges a monotonous change of an object and an arithmetic operation which judges contrast as well as the correlation arithmetic operation as the plurality of types of focus detection arithmetic operations. This will be also described later.

When an arithmetic operation of the second AF arithmetic section 11 is terminated, a predetermined interrupt signal is supplied from an interrupt generating section 12 to the AF control section 1 to inform that the arithmetic operation is terminated.

At last, when the AF control section 1 receives the interrupt signal, an arithmetic operation result is read from the second memory section 10, and a last arithmetic operation of AF is executed by the third AF arithmetic section 13 in the AF control section 1.

The third AF arithmetic section 13 executes arithmetic operations from an arithmetic operation which obtains reliability of a correlation arithmetic operation result of the second AF arithmetic section 11 to an arithmetic operation which obtains a defocus quantity of a non-illustrated shooting lens. The arithmetic operations of this third AF arithmetic section 13 have less repeated arithmetic operation parts and a complicated arithmetic algorithm and may be possibly changed, and hence they are not suitable for execution by hardware. Moreover, since a long arithmetic operation time like the correlation arithmetic operation is not required, they are suitable for execution by a microcomputer.

The multi AF sensor 3 is controlled by the above-described flow, and a defocus quantity of the shooting lens which is a final output is calculated.

Figure 4:
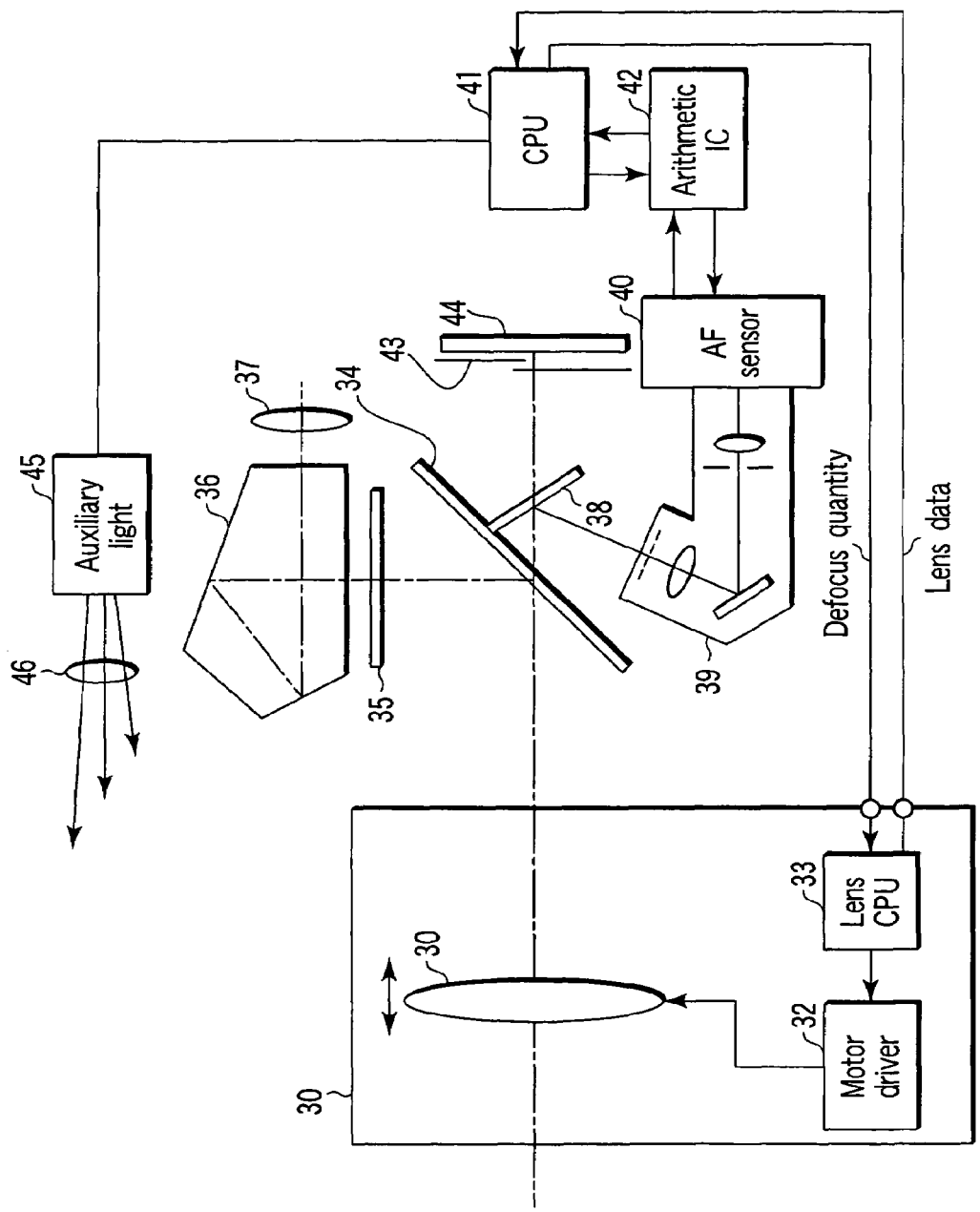
FIG. 4 is a view showing a configuration of an AF mechanism mounted in a camera system according to an embodiment.

FIG. 4 shows an AF mechanism mounted in a camera system. This drawing shows an example in which a TTL phase difference AF scheme is applied to a single-lens reflex camera.

Reference numeral 30 denotes an interchangeable lens and has a focus lens 31. The focus lens 31 is driven in an optical axis direction to obtain a focusing state. Reference numeral 32 designates a motor driver which drives the focus lens 31. Reference numeral 33 denotes a lens CPU which receives a defocus quantity from a camera main body, calculates a driving quantity of the focus lens 31, and drives and controls the focus lens 31 by this driving quantity. Reference numeral 34 designates a main mirror which is moved down as shown in the drawing to divide a light beam for an AF optical system 38 and a finder optical system 36 at the time of AF, but is moved up to lead the entire light beam toward an imaging element 44 at the time of shooting.

Reference numeral 35 denotes a finder screen; 36, a finder optical system; and 37, a finder eyepiece lens. Reference numeral 38 designates a sub-mirror which totally reflects a light beam toward an AF optical system 39 when the main mirror 34 is set in the down position, and moves up together with the main mirror 34 to a position at which a light beam toward the imaging element 44 is not prevented when the main mirror 34 is set at the up position. Reference numeral 39 denotes the AF optical system which will be described in detail with reference to FIG. 5.

Reference numeral 40 designates an AF sensor which allows a light beam divided by the AF optical system to enter a pair of photoelectric conversion element columns provided therein in order to generate a signal for focus detection, and it is, e.g., a multi AF sensor having a plurality of pairs of photoelectric conversion element columns and corresponds to the multi AF sensor 3 shown in FIG. 3. This will be described in detail with reference to FIGS. 5 and 6. Reference numeral 41 denotes a CPU which performs AF control, and this CPU receives lens data required for an arithmetic operation from the lens CPU 33 prior to the arithmetic operation and transmits a defocus quantity as an arithmetic operation result to the lens CPU 33, and corresponds to the AF control section 1 depicted in FIG. 3. Reference numeral 42 designates an arithmetic integrated circuit for AF sensor control and AF arithmetic operations, and this circuit is controlled by the CPU 41 to executes control over the AF sensor 40 and some of AF arithmetic operations, and corresponds to the arithmetic integrated circuit 2 shown in FIG. 3.

Reference numeral 43 denotes a focal plane shutter. Reference numeral 44 designates an imaging element (a CCD) and corresponds to a filter in case of a silver salt camera. Reference numeral 45 denotes an auxiliary optical circuit which emits auxiliary light which aids focus detection toward an object when the object has a low luminance and focus detection is impossible. Reference numeral 46 designates a light projection lens for auxiliary light projection.

FIG. 5 shows a configuration of the AF optical system 39 and the AF sensor 40. Since this is a configuration of a known TTL phase difference AF optical system, a brief description will be given.

When the shooting lens is in a focusing state, a light beam transmitted through the shooting lens 50 is focused on an imaging equivalent surface which is a virtual surface of a front surface of the AF optical system 39 and condensed and divided by a condenser lens 42, and the light beams are narrowed by a separator aperture 53 and respectively imageformed by separator lenses 54 on a sensor array 55A and a sensor array 55B which are the plurality of light receiving sections (the columns of the photoelectric conversion elements) in the AF sensor 40.

Measuring a gap between an image formed on the sensor array 55A and an image formed on the sensory array 55B can constitute the known TTL phase difference AF scheme which measures a defocus quantity of the shooting lens 50.

FIG. 6 shows a plurality of focus detection frames in a shooting screen of the AF sensor 40 when the AF sensor 40 is a four-line and three-point type multi AF sensor. A vertical line sensor 61 and a lateral line sensor 60 cross each other at the center. A vertical line sensor 62 exists on the left-hand side, and a vertical line sensor 63 exists on the right-hand side. These line sensors are respectively configured to have the sensor array 55A and 55B shown in FIG. 5. That is, this is a configuration in which four pairs of sensor arrays 55A and 55B exist.

Figure 7:
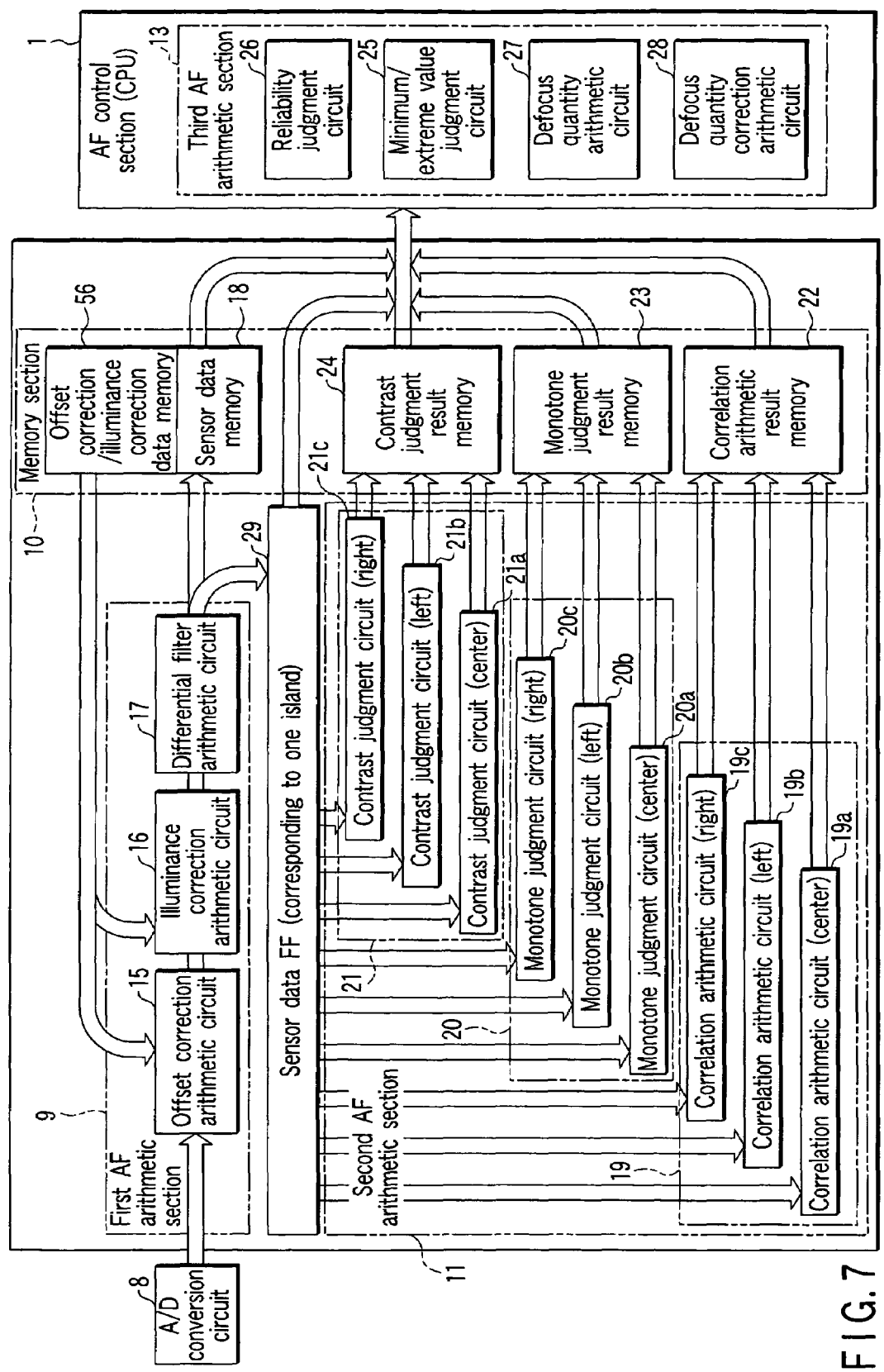
FIG. 7 is a view showing a flow of data in a first AF arithmetic section, a second AF arithmetic section and a memory section according to an embodiment.

FIG. 7 shows a flow of data in the first AF arithmetic section 9, the second AF arithmetic section 11 and the second memory section 10 in the arithmetic integrated circuit 42 for the AF sensor control and the AF arithmetic operations.

As shown in FIG. 3, an output from the multi AF sensor 3 is converted from an analog signal into a digital signal by the A/D conversion circuit 8 in accordance with each pixel, and the converted signal is transmitted to the first AF arithmetic section 9 every time conversion of one pixel is completed. The first AF arithmetic section 9 is constituted of an offset correction arithmetic circuit 15, an illuminance correction arithmetic circuit 16 and a differential filter arithmetic circuit 17.

An output from the A/D conversion circuit 8 is input to the offset correction arithmetic circuit 15. The offset correction arithmetic circuit 15 corrects an offset output (an offset component output when an integral time=0) of each pixel of the photoelectric conversion element. Particulars of the arithmetic operation will be described later.

An output from the offset correction arithmetic circuit 15 is input to the illuminance correction arithmetic circuit 16. The illuminance correction arithmetic circuit 16 corrects illuminance nonuniformity due to a reduction in a peripheral light quantity of the condenser lens 52 and the separator lenses 54 in the AF optical system 39 arranged on the front surface of the multi AF sensor 3, and also corrects sensitivity irregularities of each pixel of the photoelectric conversion element. Particulars of the arithmetic operation will be described later.

An output from the illuminance correction arithmetic circuit 16 is input to the differential filter arithmetic circuit 17. The differential filter arithmetic circuit 17 executes differential processing to perform an arithmetic operation which removes a DC component. Particulars of the arithmetic operation will be described later.

The offset correction arithmetic circuit 15 and the illuminance correction arithmetic circuit 16 execute a correction arithmetic operation by using correction data stored in an offset correction/illuminance correction data memory 56 of the second memory section 10.

An output from the first AF arithmetic section 9 is stored as sensor data in a sensor data memory 18 in the second memory section 10. The sensor data memory 18 has a capacity to store outputs from pixels of three line sensors of the four line sensors 60 to 63 depicted in FIG. 6. Contents of the sensor data memory 18 can be read by control of the AF control section 1.

Additionally, an output from the first AF arithmetic section 9 is supplied to and stored in a sensor data flip flop (FF) 29 as sensor data. The sensor data flip flop 29 corresponds to the first memory section 14 shown in FIG. 3 and functions as a plurality of storage sections, and information can be written in this flip flop 29 by control of the AF control section 1.

The sensor data flip flop 29 concurrently outputs sensor data to a correlation arithmetic section 19, a monotone judgment arithmetic section 20 and a contrast judgment arithmetic section 21 of the second AF arithmetic section 11. The correlation arithmetic section 19 has three correlation arithmetic circuits 19a, 19b and 19c. The monotone judgment arithmetic section 20 has three monotone judgment circuits 20a, 20b and 20c. The contrast judgment arithmetic section 21 has three contrast judgment circuits 21a, 21b and 21c.

The memory section 10 has the sensor data memory 18. As this sensor data memory 18, an RAM (a random access memory) is adopted.

Comparing the flip flop with the RAM, a circuit scale of the flip flop is larger than that of the RAM if they have the same capacity. Therefore, the sensor data flip flop 29 does not have a capacity corresponding to all of the four line sensors 60 to 63 shown in FIG. 6, but has a capacity corresponding to one line sensor. The circuit scale is prevented from being increased in this manner.

Therefore, sensor data of the four line sensors 60 to 63 shown in FIG. 6 is overwritten in the sensor data flip flop 29 in the order of reading. That is, of the sensor data of the line sensors read from the four line sensors 60 to 63, the sensor data which is read at last is stored in the sensor data flip flop 29.

Further, the sensor data memory 18 has a capacity corresponding to the sensor data of the three line sensors, and the sensor data of the first three line sensors is stored when the sensor data of the four line sensors 60 to 63 are read.

A wasteful memory region does not have to be provided by storing in the sensor data memory 18 the sensor data in three line sensors of the sensor data in the four line sensors 60 to 63 and storing in the sensor data flip flop 29 the sensor data of one line sensor in this manner. As a result, the circuit scale can be reduced.

It is to be noted that data can be written in the sensor data flip flop 29 by control of the AF control section 1.

The sensor data in the sensor data flip flop 29 is input to the correlation arithmetic circuits 19a, 19b and 19c, the monotone judgment circuits 20a, 20b and 20c and the contrast judgment circuits 21a, 21b and 21c in parallel.

The correlation arithmetic circuits 19a, 19b and 19c calculate a degree of correlation between sensor data in the sensor array 55A and sensor data in the sensor array 55B in one line sensor. This correlation arithmetic operation is important in order to obtain a gap between an image formed on the sensor array 55A and an image formed on the sensor array 55B. Further, the correlation arithmetic operation has the longest arithmetic operation time in all AF arithmetic operations. On the contrary, since the correlation arithmetic operation is a repetition of simple arithmetic operations, it is suitable for an arithmetic operation by hardware and has a large effect of reducing a lag time.

Arithmetic operation results of the correlation arithmetic circuits 19a, 19b and 19c are stored in a correlation arithmetic operation result memory 22 in the second memory section 10, and can be read to the AF control section 1. Particulars of the arithmetic operation will be described later.

The monotone judgment circuits 20a, 20b and 20c judge whether sensor data as targets of arithmetic operations of the correlation arithmetic circuits 19a, 19b and 19c is monotonously increased or decreased. This judgment result is stored in a monotone judgment result memory 23 in the second memory section 10, and can be read to the AF control section 1. The judgment result is left in the memory in order to simplify a configuration of hardware, and an arithmetic operation using the judgment result in the memory is executed by the third AF arithmetic section 13 in the AF control section 1. Particulars of the arithmetic operation will be described later.

The contrast judgment circuits 21a, 21b and 21c judge whether sensor data as a target of an arithmetic operation of each of the correlation arithmetic circuits 19a, 19b and 19c has contrast. This judgment result is stored in a contrast judgment result memory 24 in the second memory section 10 and can be read to the AF control section 1. In order to simplify the configuration of hardware, the judgment result is left in the memory, and an arithmetic operation using this judgment result in the memory is executed by the third AF arithmetic section 13 in the AF control section 1.

Since each arithmetic circuit in the first AF arithmetic section 9 and the second arithmetic section 11 has many repeated operations and is an already established arithmetic technology, its arithmetic specification will not be possibly changed, and hence each arithmetic circuit is suitable for an arithmetic operation in hardware. In particular, the correlation arithmetic circuits 19a, 19b and 19c require a large arithmetic operation time when an arithmetic operation by a microcomputer is adopted, and hence an arithmetic operation by hardware is suitable.

The AF control section 1 includes the third AF arithmetic section 13 which performs an AF arithmetic operation in accordance with a program having an AF arithmetic algorithm stored in a non-illustrated flash ROM, and it reads data from each memory region of the second memory section 10 and carries out the following arithmetic operation to calculate a defocus quantity of the shooting lens 50. That is, the third AF arithmetic section 13 has a minimum value/extreme value judgment circuit 25, a reliability judgment circuit 26, a defocus quantity arithmetic circuit 27, and a defocus quantity correction arithmetic circuit 28.

The minimum value/extreme value judgment circuit 25 selects a minimal value of a correlation arithmetic operation result from data in the correlation arithmetic operation result memory 22, the monotone judgment result memory 23 and the contrast judgment result memory 24, and selects its minimum value or the like. Particulars of the arithmetic operation will be described later.

The reliability judgment circuit 26 is a circuit which judges reliability of a correlation arithmetic operation based on a judgment result (a selection result) of the minimum value/ extreme value judgment circuit 25. Particulars of the arithmetic operation will be described later.

The defocus quantity arithmetic circuit 27 calculates a gap between an image forming position of the sensor array 55A and an image forming position of the sensor array 55B (an image-to-image gap), and obtains a defocus quantity of the shooting lens 50 based on the calculated gap. Particulars of the arithmetic operation will be described later.

The defocus quantity correction arithmetic circuit 28 corrects a defocus quantity calculated by the defocus quantity arithmetic circuit 27, and corrects a defocus quantity concerning a temperature, an aberration and others to calculate a defocus quantity which is finally transmitted to the lens CPU 33. Particulars of the arithmetic operation will be described later.

Each arithmetic operation in the third AF arithmetic section 13 has less repeated operations, has an arithmetic operation specification which may be possibly changed later, and does not require a large arithmetic operation time even if a microcomputer is adopted. Therefore, as each arithmetic operation in the third AF arithmetic section 13, an arithmetic operation by the microcomputer is optimum.

Figure 8:
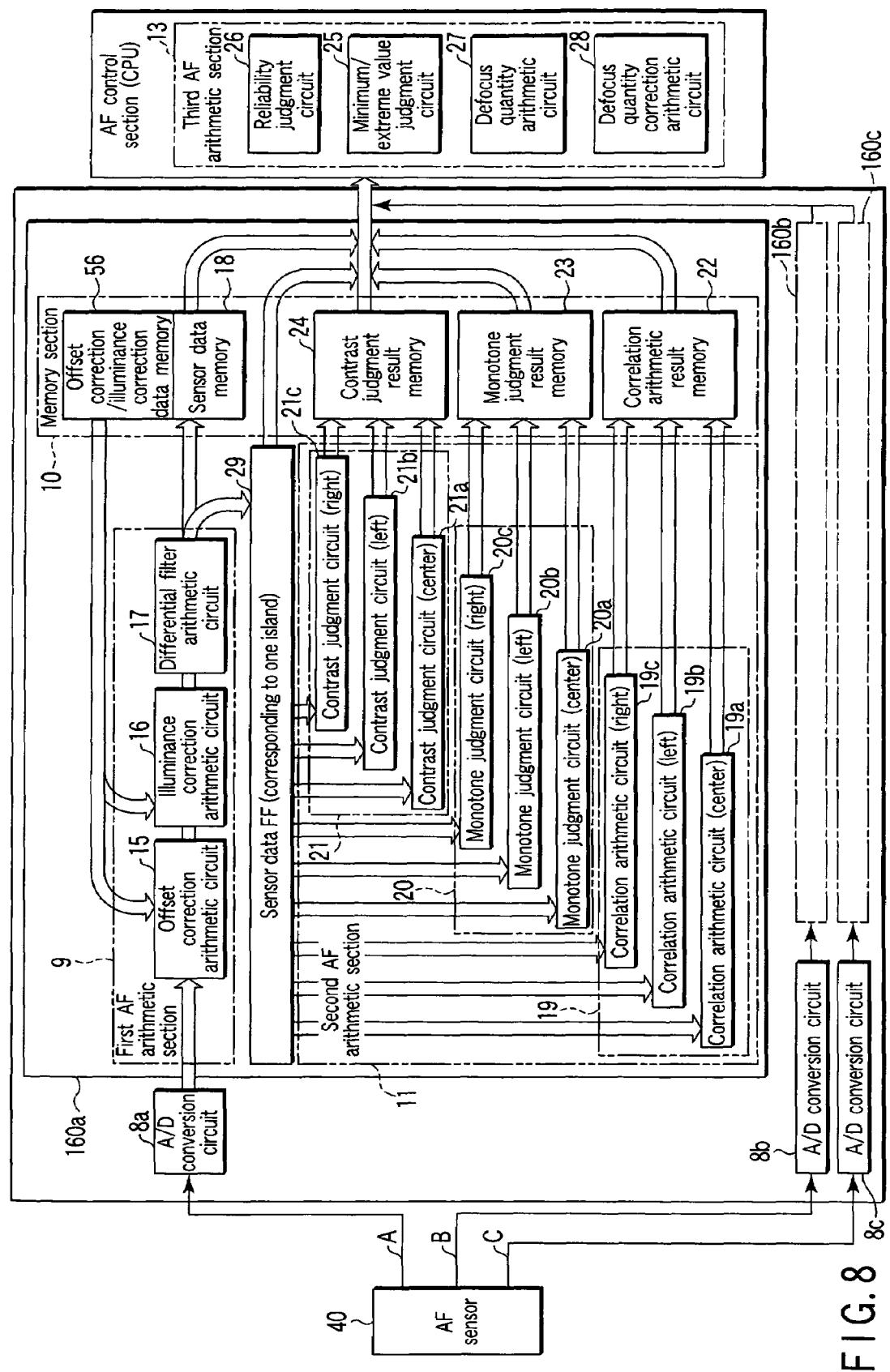
FIG. 8 is a view showing a modification of FIG. 7.

It is to be noted that FIG. 7 shows an example where the number of data output line of the AF sensor 40 is one. As shown in FIG. 8, it is possible to adopt a configuration in which three data output lines A, B and C are provided to the AF sensor 40. The data output lines A, B and C correspond to three line sensors of the line sensors 60 to 63 in the AF sensor 40.

In this case, as shown in FIG. 8, A/D conversion circuits 8b and 8c for the data output lines B and C as well as an A/D conversion circuit 8a for the data output line A are provided in accordance with the three line sensors. Furthermore, three control blocks 160a, 160b and 160c constituted of the first AF arithmetic section 9, the memory section 10, the second AF arithmetic section 11 and the sensor data flip flop 29 are provided in accordance with the A/D conversion circuits 8a, 8b and 8c. The control blocks 160a, 160b and 160c are equal to each other, and each block comprises an integrated circuit of one chip.

Figure 9:
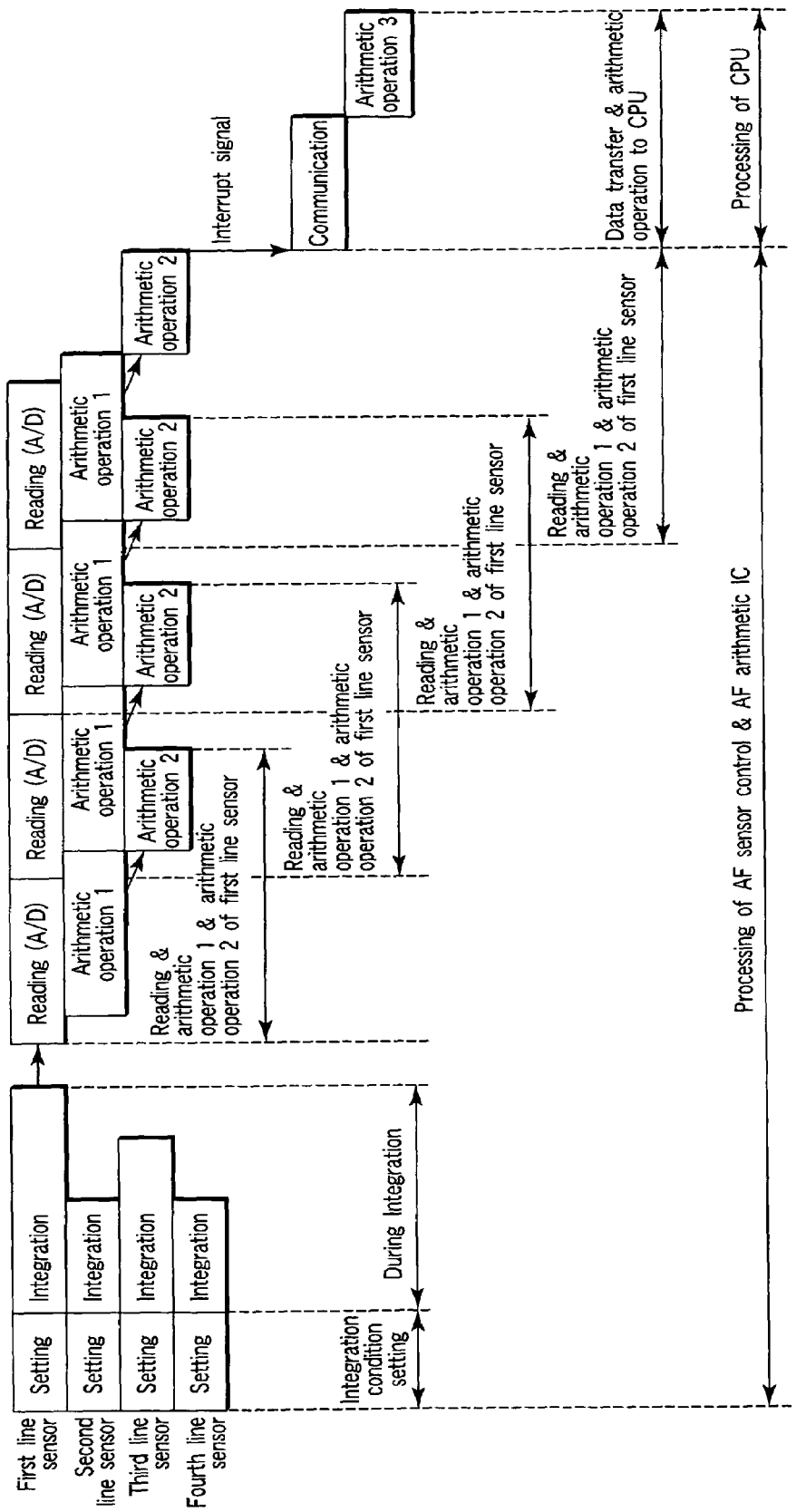
FIG. 9 is a time chart illustrating AF sensor control and an arithmetic operation of an arithmetic integrated circuit in an embodiment.

FIG. 9 is a time chart of AF sensor control and an arithmetic operation of the arithmetic integrated circuit 2.

As described in conjunction with FIG. 6, the AF sensor 40 has the four independent line sensors 60 to 63. First, the CPU 41 sets integration conditions (conditions required for integration of a sensitivity and others) in the register section 5, operates the AF sensor control section 7 through the register section 5, and starts simultaneous integration operations of the four line sensors of the AF sensor 40.

After start of the integral operations, the AF sensor 40 stops the integration upon activation of a non-illustrated internal circuit when an appropriate electric charge storage quantity is achieved. Since quantities of lights which strike on the line sensors 60 to 63 are different from each other, a timing of termination of the integration differs depending on the line sensors 60 to 63.

When the integration of the (darkest) line sensor having the longest integration time is terminated, the AF sensor control section 7 is operated through the register section 5 to control the A/D converting section 8, and an analog output for each pixel output from the AF sensor 40 is converted into a digital signal. This output for each pixel is output in the form of an analog signal in synchronization with, e.g., a pulse waveform having a several-ten µm cycle output from the AF sensor 40. The A/D converting section 8 carries out conversion in synchronization with this pulse waveform.

Sensor data of each pixel (each photoelectric conversion element) is read in the order of the line sensors 60 to 63 and, every time sensor data for one pixel is read, various kinds of arithmetic operations using this sensor data are executed by the first AF arithmetic section 9. That is, it is good enough for the first AF arithmetic section 9 to terminate arithmetic processing for one pixel, which corresponds to a time period in which processing can be sufficiently performed by a hardware arithmetic unit. Therefore, there is almost no increase in a time lag due to execution of the first AF arithmetic section 9.

When output of sensor data for a last pixel in a first line sensor is terminated, sensor data of a second line sensor is subsequently read. The first AF arithmetic section 9 performs arithmetic processing with respect to the sensor data of the last pixel of the first line sensor, and then carries out arithmetic processing of the second AF arithmetic section 11.

The processing of the second AF arithmetic section with respect to the sensor data of the last pixel of the first line sensor is executed concurrently with A/D conversion of the sensor data of the second line sensor (i.e., processing of the first AF arithmetic section 9 with respect to the sensor data of the second line sensor). That is, it is good enough for the second AF arithmetic section 11 to terminate the arithmetic processing within (several-ten μs×the number of pixels of the first line sensor), and the second AF arithmetic section 11 has a configuration of a hardware arithmetic unit which can achieve this. Therefore, there is almost no increase in a time lag due to execution of the second AF arithmetic section 11.

The above-described reading and arithmetic processing with respect to the sensor data of the first line sensor are also performed to the remaining line sensors. When the arithmetic operation of the second AF arithmetic section 11 with respect to sensor data of a fourth line sensor is terminated, an interrupt signal is output from the interrupt generating section 12 to the CPU 41. As a result, the CPU 41 is informed of termination of the arithmetic operation.

Upon receiving the interrupt signal, the CPU 41 reads an arithmetic operation result stored in the second memory section 10 through the serial communicating section 4. The read arithmetic operation result is transmitted to the third AF arithmetic section 13. The third AF arithmetic section 13 performs an arithmetic operation using a microcomputer.

When the arithmetic operation of the third AF arithmetic section 13 is terminated, a defocus quantity of the shooting lens 50 which is a final arithmetic operation result of the focus detection arithmetic operation is calculated.

Figure 10:
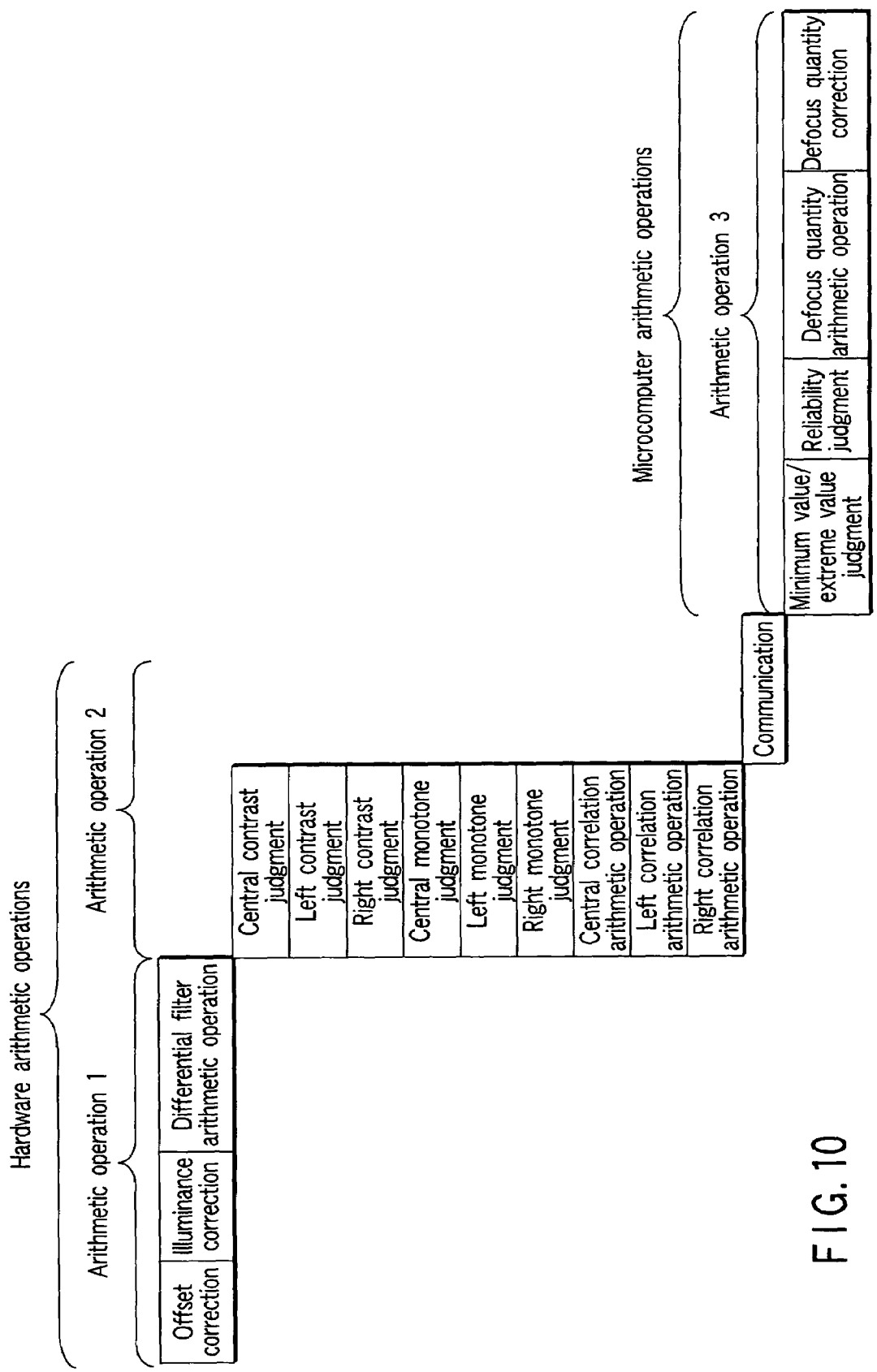
FIG. 10 is a rough time chart illustrating an order of arithmetic operations in an embodiment.

FIG. 10 is a rough time chart showing the order of arithmetic operations.

Upon receiving an output from the A/D converting section 8, the first AF arithmetic section 9 first performs an offset correction arithmetic operation, then carries out an illuminance correction arithmetic operation, and finally executes a differential filter arithmetic operation (an arithmetic operation 1 in FIGS. 9 and 10).

Further, upon receiving an output from the first AF arithmetic section 9, the second AF arithmetic section 11 concurrently performs three operations, i.e., a contrast judgment, a monotone judgment and a correlation arithmetic operation (an arithmetic operation 2 in FIGS. 9 and 10).

Furthermore, as will be described later, three focus detection frames (a central focus detection frame, a left focus detection frame and a right focus detection frame) are set on one line sensor of the AF sensor 40. The correlation arithmetic circuit 19, the monotone judgment circuit 20 and the contrast judgment circuit 21 of the second AF arithmetic section 11 have the correlation arithmetic circuits 19a, 19b and 19c, the monotone judgment circuits 20a, 20b and 20c and the contrast judgment circuits 21a, 21b and 21c corresponding to the three focus detection frames. Arithmetic operations of the correction arithmetic circuits 19a, 19b and 19c, the monotone judgment circuits 20a, 20b and 20c and the contrast judgment circuits 21a, 21b and 21c are concurrently executed as shown in FIG. 10.

Such concurrent arithmetic operations can reduce an arithmetic operation time to approximately ⅓ (an increase in a speed of an arithmetic operation) as compared with a case where each arithmetic operation is executed in a time-sharing (series) manner.

It is to be noted that, according to the configuration shown in FIG. 8, the three data output lines A, B and C are provided in the AF sensor 40, and hence sensor data of three line sensors of the line sensors 60 to 63 in the AF sensor 40 can be read in a concurrent manner rather than a sequential manner. Therefore, the correlation arithmetic operation, the monotone judgment and the contrast judgment can be concurrently executed with respect to sensor data of the three line sensors. As compared with the configuration shown in FIG. 7, arithmetic processing can be performed at a higher speed.

It is to be noted that four data output lines may be provided in the AF sensor 40. In this case, the correlation arithmetic operation, the monotone judgment and the contrast judgment can be concurrently executed with respect to sensor data of the four line sensors. Therefore, arithmetic processing can be effected at a further higher speed.

Moreover, upon receiving an output from the second AF arithmetic section 11, the third AF arithmetic section 13 first performs a minimum value/extreme value judgment, then carries out a reliability judgment, subsequently executes a defocus quantity arithmetic operation and further effects a defocus quantity correction arithmetic operation.

Arithmetic operations by hardware of the first AF arithmetic section 9 will be first described.

Particulars of each arithmetic operation block will be explained hereinafter.

Even if a uniform-luminance surface is ideally imaged, flat sensor data cannot be actually obtained due to a reduction in a peripheral light quantity of the AF optical system lens (the condenser lens 52 and the separator lenses 54) and irregularities in individual pixels (an inclination component and an offset component).

Processing which corrects a noise component concerning the AF optical system and sensor pixel characteristics is generically referred to as flatness correction. This flatness correction flats sensor data when an ideal uniform-luminance surface is imaged.

As the flatness correction, there are offset correction and illuminance correction. Correcting each offset component (fixed pattern noise removal) of each pixel will be referred to as offset correction. Correcting a reduction in a peripheral light quantity of the AF optical system and sensitivity irregularities of respective pixels will be referred to as illuminance correction.

Figure 11:
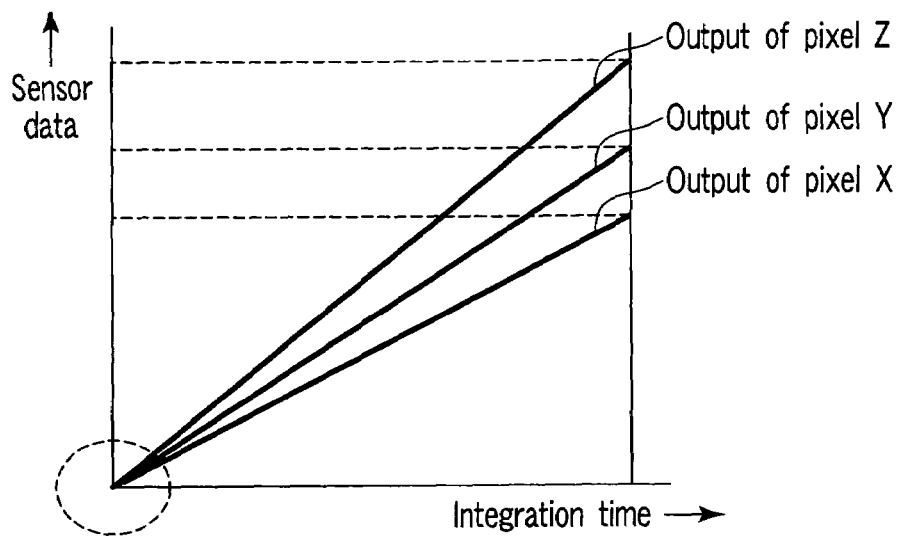
FIG. 11 is a view showing a concept of offset correction in an embodiment.

FIG. 11 is a conceptual view of the offset correction.

Figure 12:
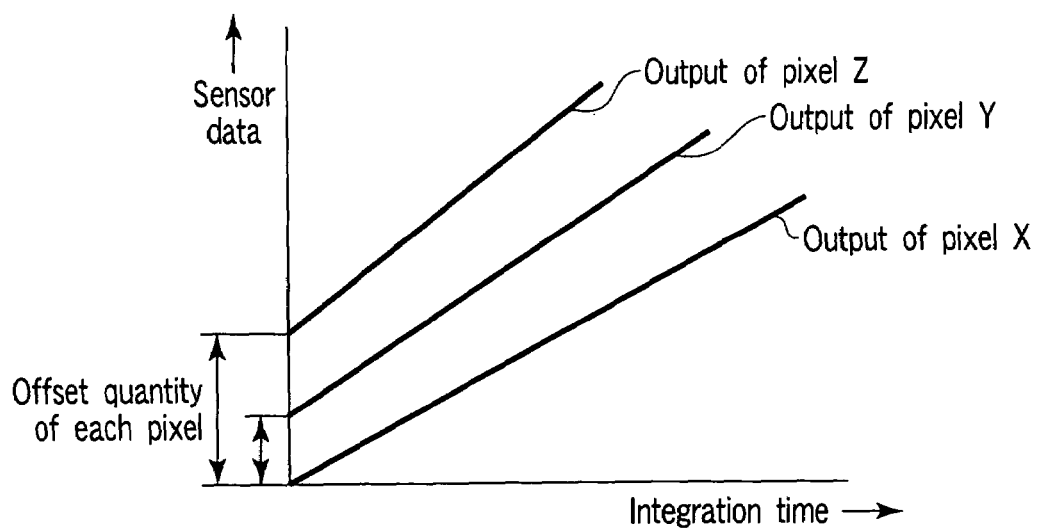
FIG. 12 is an enlarged view showing the vicinity of an origin in FIG. 11.

In one photoelectric conversion element corresponding to one pixel, an electric charge storage time (an integral time) and its output (sensor data) are substantially in proportion to each other. An inclination of such output characteristics slightly differs in accordance with each pixel. Enlarging the vicinity of an origin of the output characteristics (a part surrounded by a broken line in the drawing), as shown in FIG. 12, a small output difference is generated depending on each pixel even if an integral time is zero. This output difference is an offset quantity (a fixed pattern component). The offset correction means measuring this offset quantity in advance and correcting sensor data by the measured offset quantity. An output of each pixel runs through the origin of the output characteristics by this offset correction.

Figure 13:
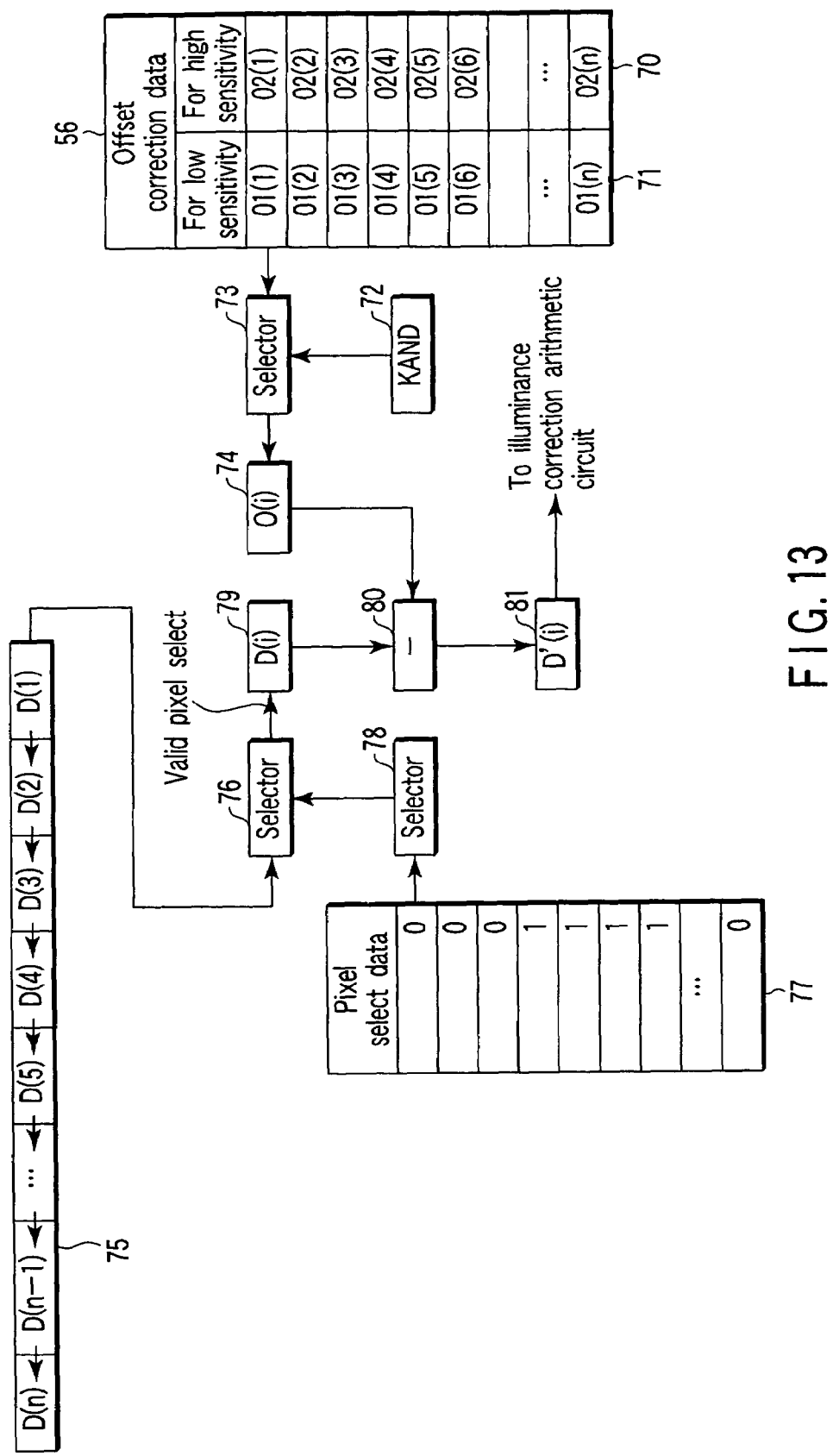
FIG. 13 is a view showing an operation of hardware of an offset correction arithmetic circuit in an embodiment.

FIG. 13 shows an operation of hardware of the offset correction arithmetic circuit 15.

There are the following (1) to (4) as input data, and there is corrected data D' as output data.

(1) An output D(i) of the A/D conversion circuit 8 [an output value of the A/D conversion circuit 8]

(2) Sensor sensitivity data (KAND, one bit) [a set value of the register section 5]

(3) Offset correction data 01($i$) and 02($i$) [the offset correction/illuminance correction data memory]

(4) Pixel select data (one bit) [a set value of the register section 5]

The output D(i) from the A/D conversion circuit 8 is an output itself of a pixel (the photoelectric conversion element). The sensor sensitivity data (KAND) represents a sensitivity of the AF sensor 40. That is because the AF sensor 40 has a low-sensitivity mode and a high-sensitivity mode, and an offset quantity varies depending on each sensitivity. The offset correction data 01(*i*) and 02(*i*) are offset correction data for respective sensitivities. 01(*i*) is offset correction data in case of the low-sensitivity mode. 02(*i*) is offset correction data in case of the high-sensitivity mode. These offset correction data are measured in accordance with each camera body and stored in a non-illustrated FROM in the AF control section 1 in a manufacturing process in a factory. Prior to start of the offset correction, correction data is previously stored in the offset correction/illuminance correction data memory 56.

Additionally, since the offset correction is a first arithmetic operation, an arithmetic operation of valid pixels alone is performed in accordance with pixel selection information set in the register 5. That is, since outputs from the A/D conversion circuit 8 include outputs of a light shielding pixel or a dummy pixel, valid pixels alone are selected and supplied to the arithmetic section on the subsequent stage.

First, a selector 73 selects one of high-sensitivity offset correction data 70 and low-sensitivity offset correction data 71 (e.g., eight-bit data) which is used as a correction value in accordance with sensor sensitivity data (KAND) 72. The selected correction value is supplied to a register (16 bits) 74 on the subsequent stage.

An A/D conversion circuit output 75 (e.g., 10-bit sensor data) is supplied to a selector 76 (e.g., an arithmetic operation in units of 16 bits) every time the A/C conversion for each pixel is terminated.

Data representing that pixel data of which pixel is currently read this time is selected from pixel select data (one bit "1" is corrected (a valid pixel), and one bit "0" is not corrected (an invalid pixel)) 77 by a selector 78. The selector 76 supplies an output of the A/D conversion circuit output 75 to a register (16 bits, high-order six bits=0) 79 on the subsequent stage only when contents of the selector 78 are "1".

A subtracter 80 substrates an output (e.g., eight bits) O(i) of the register 74 from an output (e.g., 16 bits) D(i) of the register 79, and supplies a result D'(i) of this subtraction to a register (16 bits, high-order six bits=0) 81.

$$D'(i)=D(i)-O(i)$$

At last, the result (e.g., high-order six bits of valid 10 bits in the 16 bits are "0") D'(i) stored in the register 81 is supplied to the next illuminance correction circuit 16.

Figure 14:
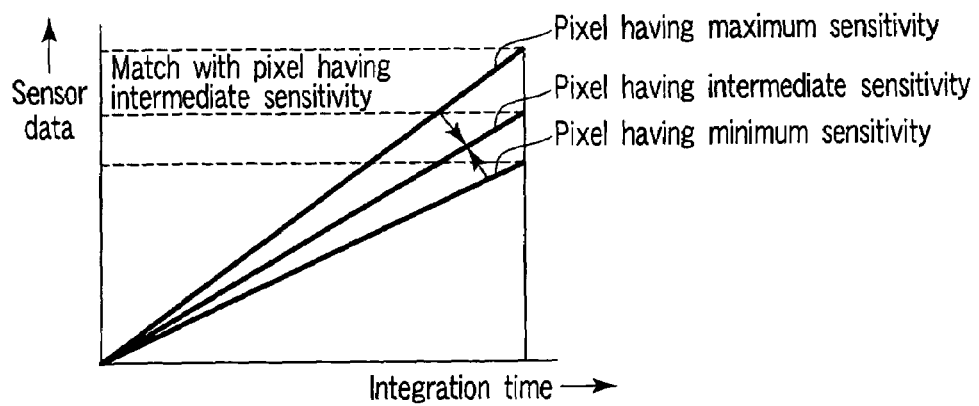
FIG. 14 is a view showing a concept of illuminance correction in an embodiment.

FIG. 14 is a conceptual view of illuminance correction.

As described in conjunction with FIG. 11, an electric charge storage time (an integral time) and an output (sensor data) are substantially in proportion to each other. An inclination of such output characteristics slightly differs in accordance with each pixel due to irregularities in sensitivity of respective pixels. The illuminance correction corrects a difference in output between respective pixels due to irregularities in sensitivity of respective pixels and a reduction in a peripheral light quantity of the optical system. Specifically, outputs of all pixels are corrected to match with an output of a pixel having a predetermined sensitivity, e.g., an intermediate sensitivity.

That is, an output of a pixel having a low sensitivity is multiplied by a coefficient which is not smaller than "1" and thereby increased. On the contrary, an output of a pixel having a high sensitivity is multiplied by a coefficient less than "1" and thereby decreased.

Figure 15:
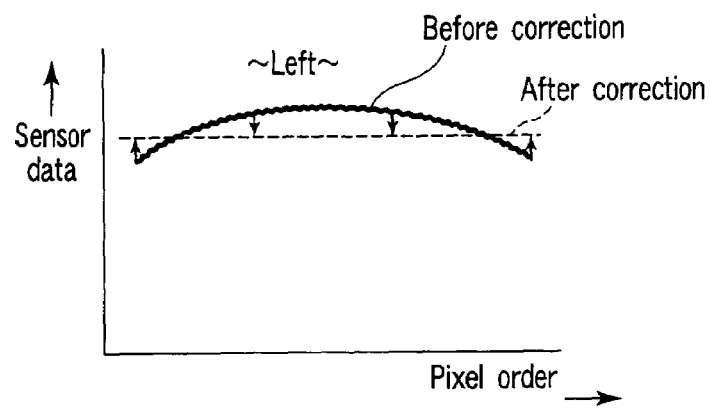
FIG. 15 is a view showing an output before illuminance correction when a uniform-luminance surface is imaged in an embodiment.
Figure 16:
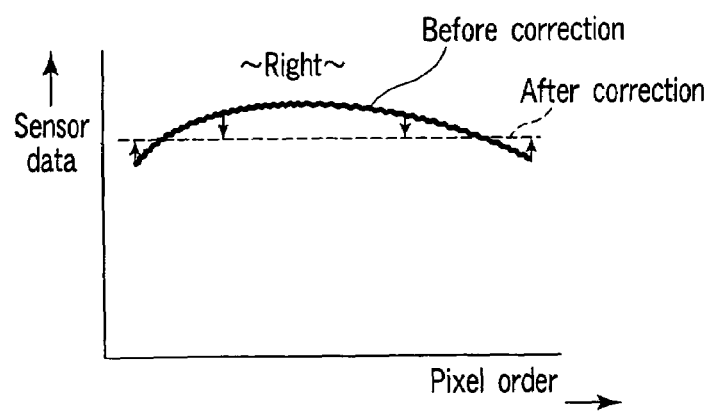
FIG. 16 is a view showing an output after illuminance correction when a uniform-luminance surface is imaged in an embodiment.

FIGS. 15 and 16 show outputs before and after illuminance correction when a uniform-illuminance surface is imaged. Respective pixels are aligned along a horizontal axis, and outputs of respective adjacent pixels are connected through a line.

Sensor data has a bowl-like knurling shape due to irregularities in sensitivity of respective pixels and a reduction in a peripheral light quantity of the optical system before correction, but has a flat shape like a broken line after correction.

A correction coefficient of each pixel is measured in advance, and this correction coefficient is multiplied by sensor data before correction so that sensor data of respective pixels with respect to the uniform-illuminance surface become equal to each other.

FIG. 17 shows an operation of hardware of the illuminance correction circuit 16.

There are the following (1) to (3) as input data, and there is data D" after correction as output data.

(1) An output D'(i) of the offset correction arithmetic circuit [an output value of the register 81]

(2) Sensor sensitivity data (KAND, one bit) [a value of the register 72, which is equal to that in the offset correction]

(3) Illuminance correction data H1(*i*) and H2(*i*) [the offset correction/illuminance correction data memory 56]

The illuminance correction data H1(*i*) and H2(*i*) are illuminance correction data for respective sensitivities. H1(*i*) is illuminance correction data in a low-sensitivity mode. H2(*i*) is illuminance correction data in a high-sensitivity mode. These illuminance correction data are measured in accordance with each camera body and stored in a non-illustrated FROM in the AF control section 1 in a manufacturing process in a factory. Prior to start of the illuminance correction, the illuminance correction data is set in the offset correction/ illuminance correction data memory 56 in advance.

Since the illuminance correction data is the above-described correction coefficient and a value which is approximately "1", it consists of a total of nine bits in which an integer section is formed of one bit and a decimal section consists of eight bits, for example.

First, a selector 84 selects one of high-sensitivity illuminance correction data (nine bits) 82 and low-sensitivity illuminance correction data (nine bits) 83 which is used as a correction value in accordance with sensor sensitivity data (KAND) 72. The selected correction value is supplied as correction data H(i) to a register 85 (16 bits, high-order seven bits=0) on the subsequent stage.

A multiplier 86 multiplies the output D'(i) of the register 81 which is an offset correction result by the output H(i) of the register 85, and supplies its result D"(i) to a register 87.

$$D''(i)=D'(i)\times H(i)$$

At last, the result stored in the register 87 (e.g., high-order six bits of valid 10 bits in the 16 bits are "0") is supplied to the next differential filter arithmetic circuit 17.

Figure 18:
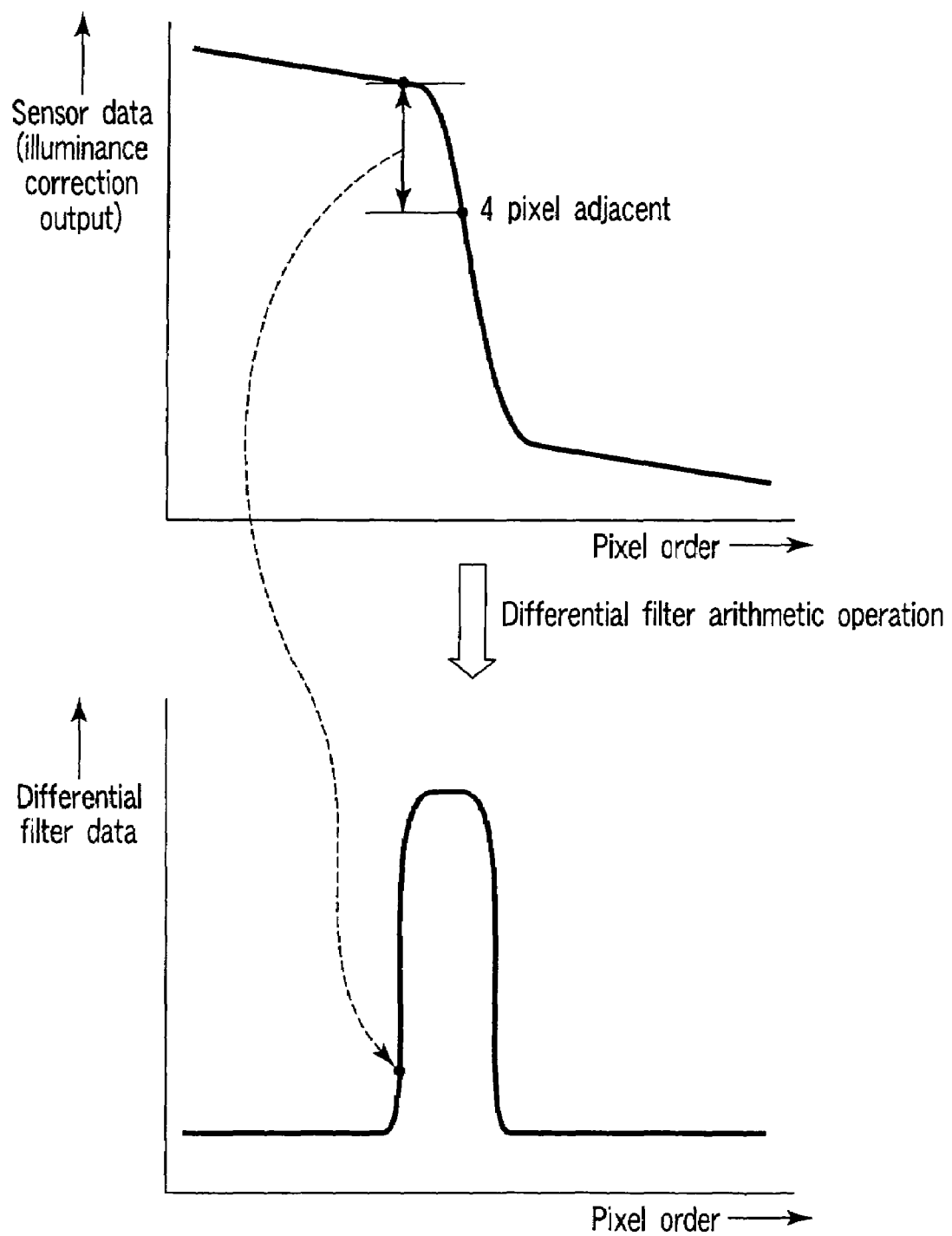
FIG. 18 is a view showing a concept of a differential filter arithmetic operation in an embodiment.

FIG. 18 is a conceptual view of a differential filter arithmetic operation by the differential filter arithmetic circuit 17.

The differential filter arithmetic circuit 17 determines a difference between an illuminance correction output with respect to sensor data of a given pixel and an illuminance correction output with respect to sensor data of a fourth pixel from this pixel as a differential output. Sensor data subjected differential processing in this differential filter arithmetic circuit 17 is a target of an arithmetic operation such as a correlation arithmetic operation on the subsequent stage.

Adding this differential processing can remove a low-frequency component from the sensor data. In particular, when an object has relatively low contrast, an improvement in an accuracy of focus detection can be expected by adding this differential processing. Further, since a level difference between sensor data of the sensor array 55A and sensor data of the sensor array 55B is removed, a reduction in reliability of the correlation arithmetic operation due to an influence of the level difference can be eliminated.

Figure 19:
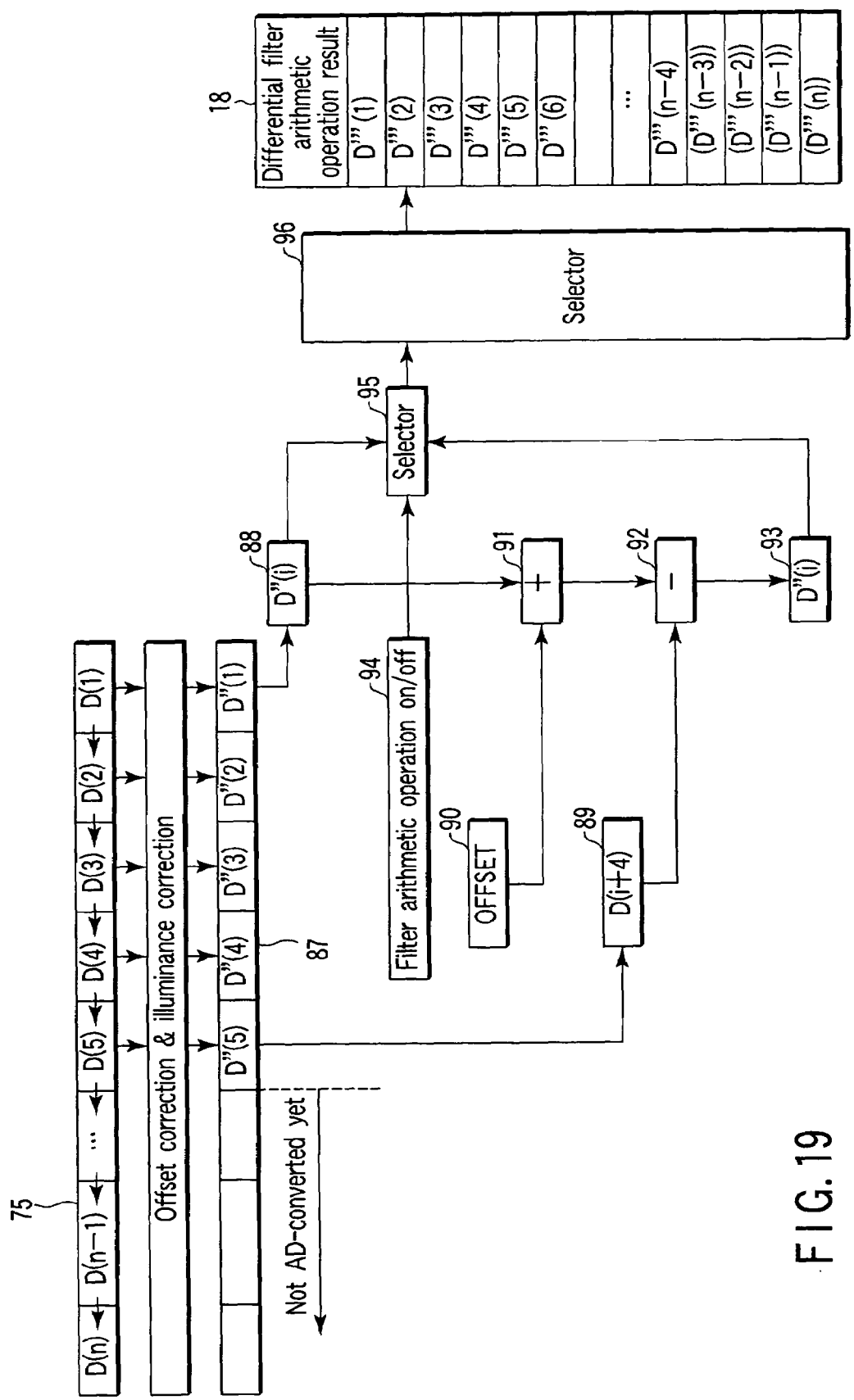
FIG. 19 is a view showing an operation of hardware of a differential filter arithmetic circuit in an embodiment.

FIG. 19 shows an operation of hardware of the differential filter arithmetic circuit 17.

There are the following (1) to (3) as input data, and there is data D''' after correction as output data.

(1) An output D''(i) of the illuminance correction circuit [an output value of the register 87]

(2) An offset value of the differential arithmetic operation [a set value in the register section 5]

(3) An on/off register indicating whether the differential filter arithmetic operation is executed [a set value in the register section 5]

As described above, the illuminance correction arithmetic operation is executed every time the A/D conversion of sensor data corresponding to one pixel is terminated in the A/D conversion circuit 8, and a result of this illuminance correction arithmetic operation is sequentially stored in the register 87. The differential filter arithmetic circuit 17 determines a difference between an illuminance correction output with respect to sensor data of a given pixel and an illuminance correction output with respect to sensor data of a fourth pixel from this pixel as a differential output. Therefore, the differential filter arithmetic circuit 17 waits for termination of the illuminance correction arithmetic operation with respect to sensor data corresponding to four pixels, and then sequentially executes the arithmetic operation.

First, sensor data output from the illuminance correction arithmetic circuit 16 is stored in a register 88 as an arithmetic operation target. Then, after termination of the illuminance correction arithmetic operation with respect to sensor data corresponding to four pixels, sensor data output from the illuminance correction arithmetic circuit 16 is stored in a register 89.

Furthermore, in an adder 91, an offset value (OFFSET) of the differential arithmetic operation previously stored in a register 90 is added to the sensor data in the register (16 bits, high-order six bits are "0") 88. Moreover, in a subtracter 92, a result of the subtracter 91 is subtracted from the sensor data in the register 89. A result of the subtracter 92 is stored in a register (16 bits, high-order six bits are "0") 93.

It is to be noted that the correlation arithmetic unit on the subsequent stage becomes complicated when a result of the differential filter arithmetic operation is a negative number. Thus, the offset value is added so that a result of the differential filter arithmetic operation does not become a negative number. Additionally, a negative number is prevented from being provided during the arithmetic operation by adding the offset value before subtraction in the subtracter 92. Preventing a negative number from being provided during the arithmetic operation can simplify the configuration of the arithmetic unit.

Further, a selector 95 operates in accordance with contents in a filter arithmetic operation on/off register 94 which determines whether the filter arithmetic operation is executed. That is, the selector 95 supplies sensor data in the register 88 to a selector 96 when contents of the filter arithmetic operation on/off register 94 are "off", and supplies sensor data in the register 93 to the selector 96 when contents of the filter arithmetic operation on/off register 94 are "on" (the filter arithmetic operation is executed). The selector 96 selects a predetermined storage address in the sensor data memory 18 in accordance with the fact that sensor data of which pixel is currently processed. Furthermore, the selector 96 stores sensor data supplied from the selector 95 at the selected storage address.

Since sensor data corresponding to last four pixels does not exist when contents of the filter arithmetic operation on/off register 94 are "on" (the filter arithmetic operation is executed), last four storage addresses in the sensor data memory 18 are vacant.

With the above-described hardware configuration, a speed of the arithmetic operations can be increased. Therefore, the three types of arithmetic operation processing (the offset correction arithmetic operation, the illuminance correction arithmetic operation and the differential filter arithmetic operation) can be executed substantially concurrently with the conversion operation of the A/D conversion circuit 8. A time lag of the arithmetic operation processing can be reduced.

Arithmetic operations by hardware of the second AF arithmetic section 11 will now be described. First, a description will be given as to the correlation arithmetic circuits 19a, 19b and 19c.

Each line sensor of the AF sensor 40 has three focus detection frames. That is, as shown in FIG. 20, three frames, i.e., a left focus detection frame 101, a central focus detection frame 102 and a right focus detection frame 103 are set on one line sensor consisting of the sensor arrays 55A and 55B. Existence of the three focus detection frames 101, 102 and 103 enables secure focus detection even if reflected light from an object strikes on any position of the line sensor.

The correlation arithmetic circuit 19a executes a correlation arithmetic operation based on sensor data from the left focus detection frame 101. The correlation arithmetic circuit 19b executes a correlation arithmetic operation based on sensor data from the central focus detection frame 102. The correlation arithmetic circuit 19c executes a correlation arithmetic operation based on sensor data from the right focus detection frame 103.

Figure 21:
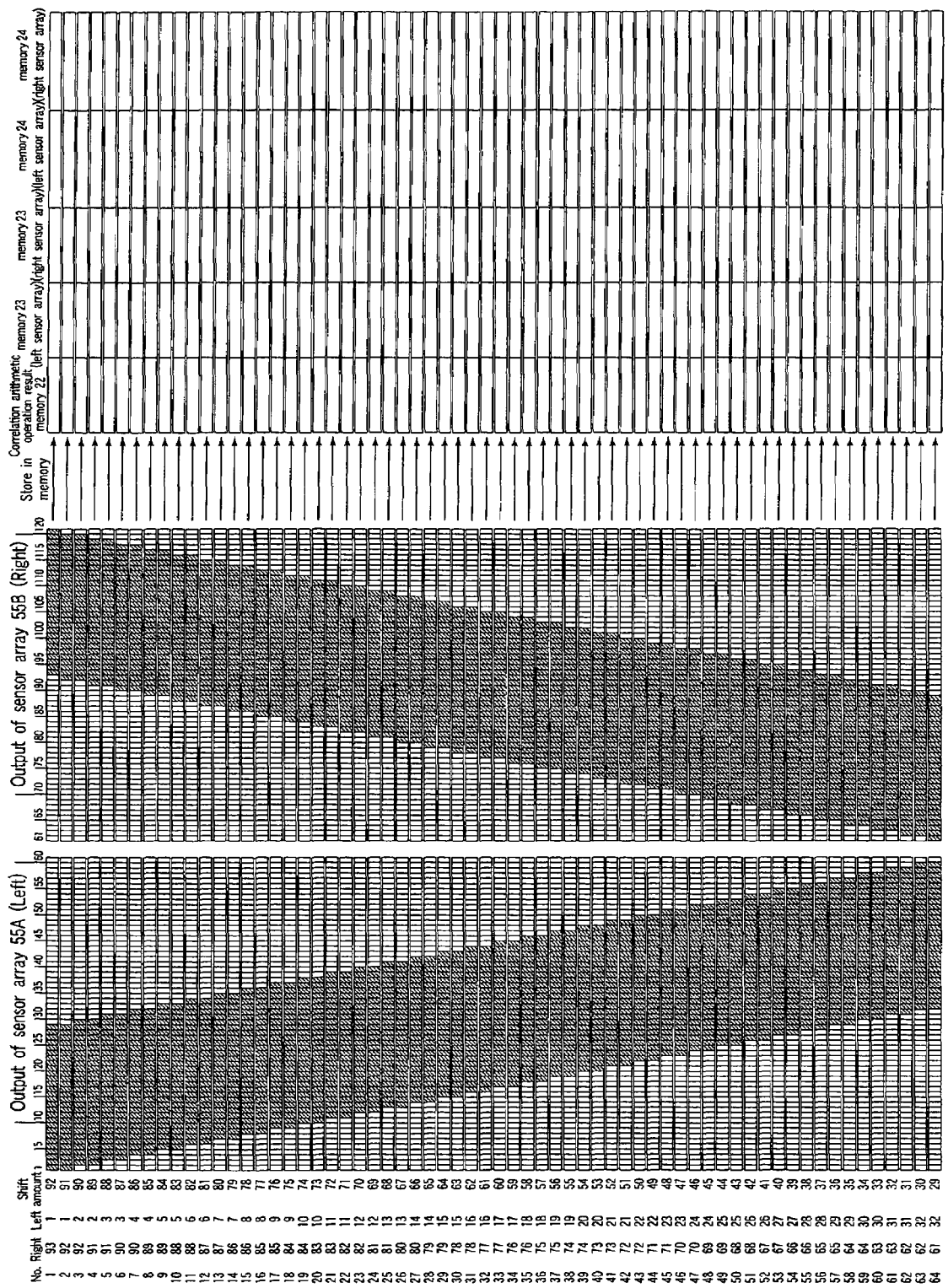
FIG. 21 is a view illustrating shifting of a correlation arithmetic operation in a central focus detection frame in an embodiment.

FIG. 21 illustrates shifting of the correlation arithmetic operation in the central focus detection frame 102.

This is an example in which the sensor array 55A has 60 pixels and the sensor array 55B has 60 pixels. An output from the sensor array 55A is defined as left sensor data (16 bits) and an output from the sensor array 55B is defined as right sensor data (16 bits). Moreover, serial numbers "1" to "120" are sequentially given to a total of 120 pixels of the sensor arrays 55A and 55B from a leading pixel on the left-hand side.

As a first shift position, a left correlation block (an oblique line in the drawing) having sensor data of 28 pixels whose serial numbers are "1" to "28" as an arithmetic operation target is set, and a right correlation block (an oblique line in the drawing) having sensor data of 28 pixels whose serial numbers are "93" to "120" as an arithmetic operation target is set. Since the serial number of a pixel at a leading position in the left correlation block is "1" and the serial number of a pixel at a leading position in the right correlation block is "93", a shift amount of the left correlation block and the right correlation block is 91 in terms of the pixel number.

As a second shift position, a left correlation block (an oblique line in the drawing) having sensor data of 28 pixels whose serial numbers are "1" to "28" as an arithmetic operation target is set, and a right correlation block (an oblique line in the drawing) having sensor data of 28 pixels whose serial numbers are "92" to "119" as an arithmetic operation target is set. A shift amount of the left correlation block and the right correlation block is 91 in terms of the pixel number.

As a third shift position, a left correlation block (an oblique line in the drawing) having sensor data of 28 pixels whose serial numbers are "2" to "29" as an arithmetic operation target is set, and a right correlation block (an oblique line in the drawing) having sensor data of 28 pixels whose serial numbers are "92" to "119" as an arithmetic operation target is set. A shift mount of the left correlation block and the right correlation block is 90 in terms of the pixel number.

In this manner, the right correlation block and the right correlation block are alternately shifted in accordance with each pixel. Repeating this shift can set 64 patterns as combinations of the right correlation block and the right correlation block. The correlation arithmetic operation is executed in accordance with such a pattern. This central focus detection frame 102 has a shift amount corresponding to 92 to 29 pixels as a detection capability.

The correlation arithmetic operation executed at each shift position is shown in the following expression.

$$F=\Sigma|DL(i)-DR(i)| (i=1 \text{ to } 28)$$

DL(i) is an output of an ith pixel in the left correlation block. DR(i) is an output of an ith pixel in the right correlation block. F is a correlation value.

The correlation value F becomes a smaller value as the left correlation block and the right correlation block resemble each other (as the correlation is high).

The correlation value F at each shift position is stored in the correlation arithmetic operation result memory 22.

A result of the later-described monotone judgment is stored in the monotone judgment result memory 23 in accordance with the left side and the right side. A result of the later-described contrast judgment is also stored in the contrast judgment result memory 24 in accordance with the left side and the right side.

Figure 22:
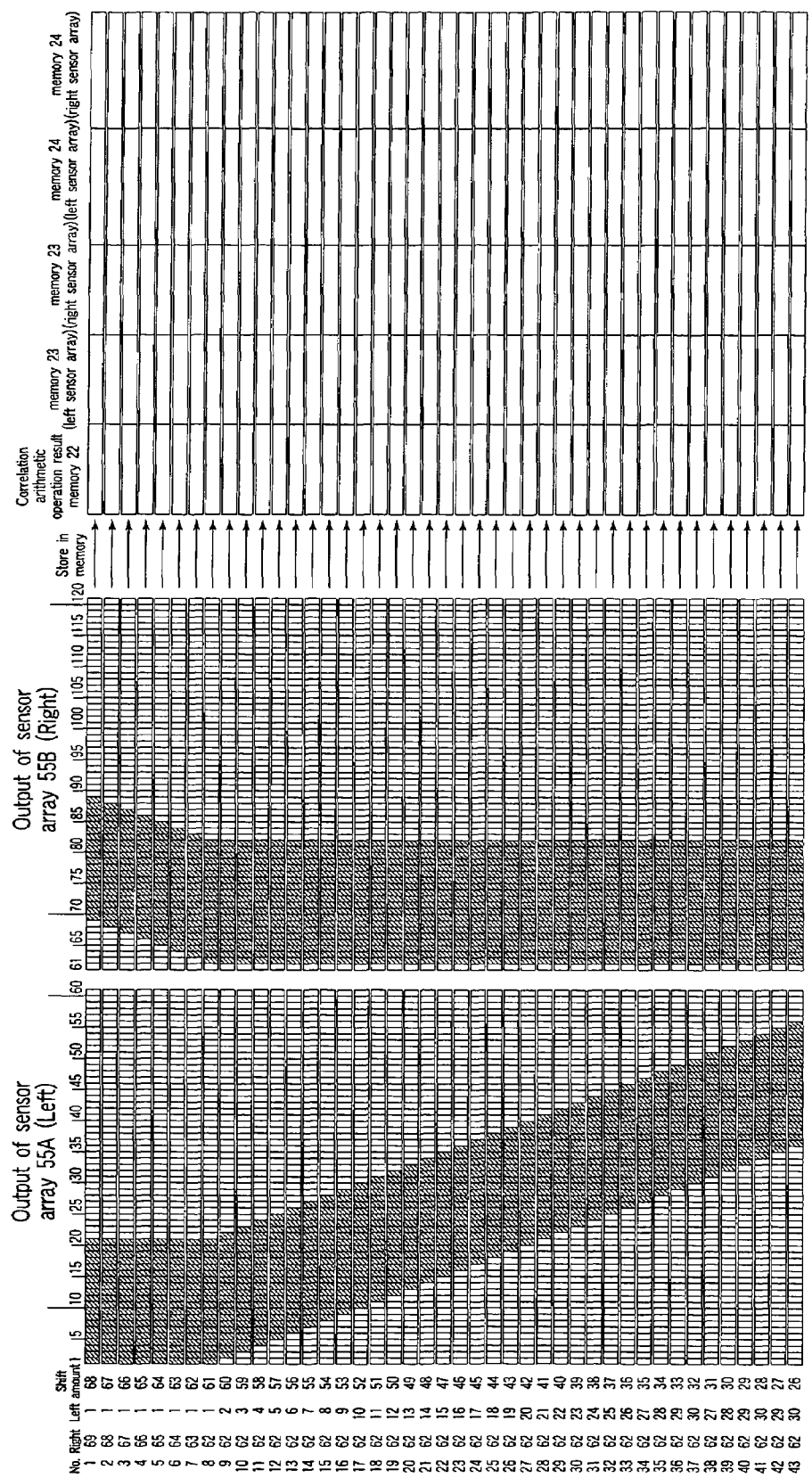
FIG. 22 is a view illustrating shifting of a correlation arithmetic operation in a left focus detection frame in an embodiment.

FIG. 22 illustrates shifting of the correlation arithmetic operation in the left focus detection frame 101.

As a first shift position, a left correlation block (an oblique line in the drawing) having sensor data of 20 pixels whose serial numbers are "1" to "20" as an arithmetic operation target is set, and a right correlation block (an oblique line in the drawing) having sensor data of 20 pixels whose serial numbers are "69" to "88" as an arithmetic operation target is set. Since the serial number of a pixel at a leading position in the left correlation block is "1" and the serial number of a pixel at a leading position in the right correlation block is "69", a shift amount of the left correlation block and the right correlation block is 68 in terms of the pixel number.

As a second shift position, a left correlation block (an oblique line in the drawing) having sensor data of 20 pixels whose serial numbers are "1" to "20" as an arithmetic operation target is set, and a right correlation block (an oblique line in the drawing) having sensor data of 20 pixels whose serial numbers are "68" to "87" as an arithmetic operation target is set. A shift amount of the left correlation block and the right correlation block is 67 in terms of the pixel number.

As a third shift position, a left correlation block (an oblique line in the drawing) having sensor data of 20 pixels whose serial numbers are "1" to "20" as an arithmetic operation target is set, and a right correlation block (an oblique line in the drawing) having sensor data of 20 pixels whose serial numbers are "67" to "86" as an arithmetic operation target is set. A shift amount of the left correlation block and the right correlation block is 66 in terms of the pixel number.

In this manner the right correlation block and the right correlation block are alternately shifted in accordance with each pixel. Repeating this shift can set 43 patterns as combinations of the right correlation block and the right correlation block. The correlation arithmetic operation is executed in accordance with each of these patterns. This left focus detection frame 101 has a shift amount corresponding to 68 to 26 pixels as a detection capability.

The correlation value F at each shift position is stored in the correlation arithmetic operation result memory 22.

Figure 23:
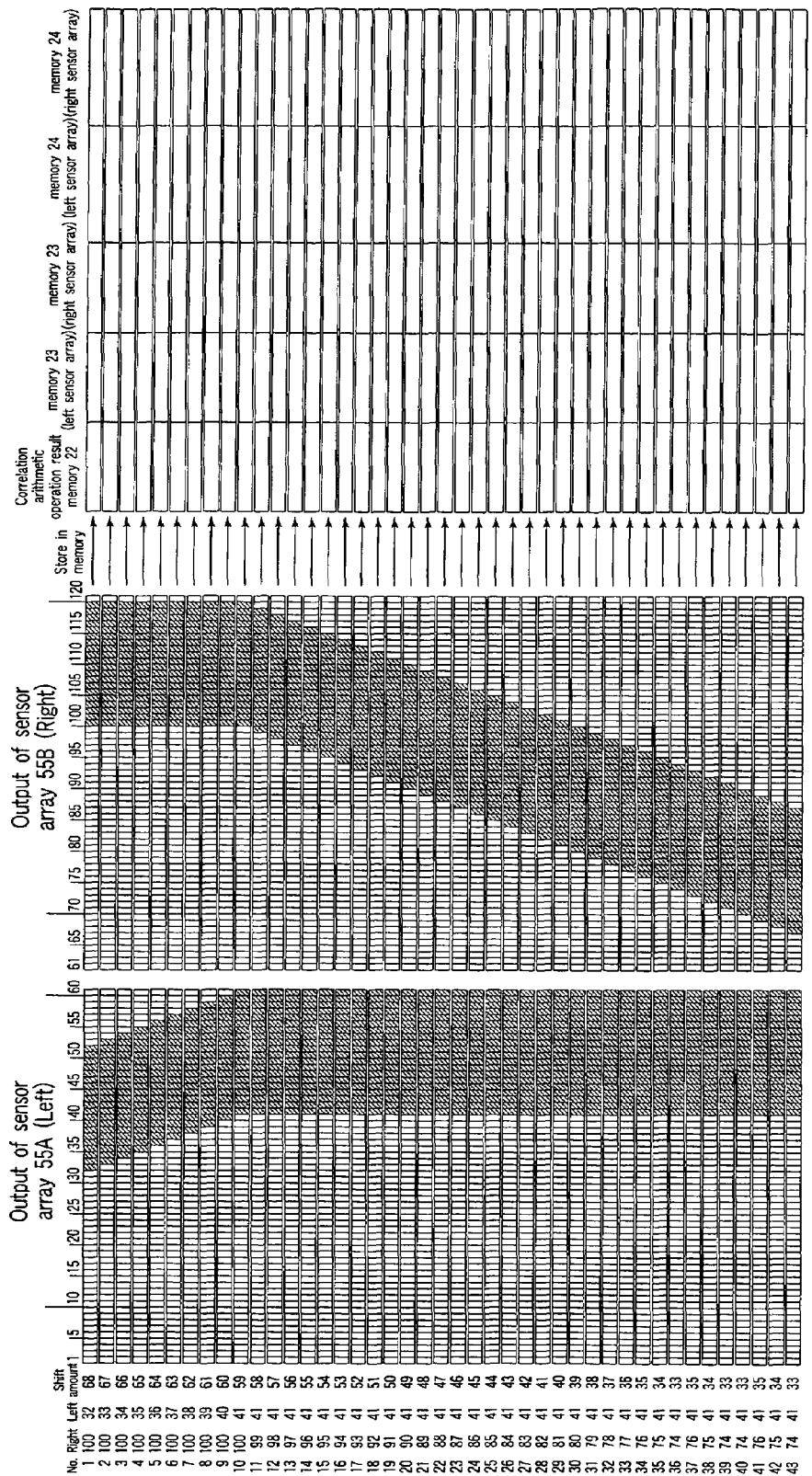
FIG. 23 is a view illustrating shifting of a correlation arithmetic operation in a right focus detection frame in an embodiment.

FIG. 23 illustrates shifting of the correlation arithmetic operation in the right focus detection frame 103.

As a first shift position, a left correlation block (an oblique line in the drawing) having sensor data of 20 pixels whose serial numbers are "32" to "51" as an arithmetic operation target is set, and a right correlation block (an oblique line in the drawing) having sensor data of 20 pixels whose serial numbers are "100" to "119" as an arithmetic operation target is set. Since the serial number of a pixel at a leading position in the left correlation block is "32" and the serial number of a pixel at a leading position in the right correlation block is "100", a shift amount of the left correlation block and the right correlation block is 68 in terms of the pixel number.

As a second shift position, a left correlation block (an oblique line in the drawing) having sensor data of 20 pixels whose serial numbers are "33" to "52" as an arithmetic operation target is set, and a right correlation block (an oblique line in the drawing) having sensor data of 20 pixels whose serial numbers are "68" to "87" as an arithmetic operation target is set. A shift amount of the left correlation block and the right correlation block is 67 in terms of the pixel number.

As a third shift position, a left correlation block (an oblique line in the drawing) having sensor data of 20 pixels whose serial numbers are "34" to "53" as an arithmetic operation target is set, and a right correlation block (an oblique line in the drawing) having sensor data of 20 pixels whose serial numbers are "67" to "86" as an arithmetic operation target is set. A shift amount of the left correlation block and the right correlation block is 66 in terms of the pixel number.

In this manner, the right correlation block and the right correlation block are alternately shifted in accordance with each pixel. Repeating this shift can set 43 patterns as combinations of the right correlation block and the right correlation block. The correlation arithmetic operation is executed in accordance with each of these patterns. This right focus detection frame 103 has a shift amount corresponding to 68 to 33 pixels as a detection capability.

The correlation value F at each shift position is stored in the correlation arithmetic operation result memory 22.

FIG. 24 shows an operation of hardware of the correlation arithmetic circuits 19a, 19b and 19c. There are the following (1) to (5) as input data, and there is a correlation value F(k) as output data (k=1 to SFT).

(1) Left sensor data DL(i)
(2) Right sensor data DR(i)
(3) Data SFT representing that which pixel shown in FIGS. 16 to 18 has sensor data which is a target of the current correlation arithmetic operation
(4) Data AREA representing that which one of the line sensors 60 to 63 outputs sensor data as a target of the current correlation arithmetic operation
(5) Data WAKU representing that which one of the respective focus detection frames 101, 102 and 103 executes the current correlation arithmetic operation A description will be given on an example of the correlation arithmetic operation in the central focus detection frame 102 (it is assumed that the data EREA and the data WAKU are set to appropriate values).

First, when the data SFT="1" is set, the correlation arithmetic operation between the left correlation block and the right correlation block at an uppermost shift position shown in FIG. 21 is carried out. A selector 109 selects left sensor data (sensor data of 28 pixels whose serial numbers are "1" to "28") of sensor data stored in the sensor data flip flop 29. A selector 110 selects right sensor data (sensor data of 28 pixels whose serial numbers are "93" to "120") of the sensor data stored in the sensor data flip flop 29.

A selector 112 selects one set of sensor data DL(i) from a left sensor data group 111 selected by the selector 109. The selected sensor data is stored in a register 113. Moreover, a selector 115 selects one set of sensor data DR(i) from a right sensor data group 114 selected by the selector 110. The selected sensor data is stored in a register 116.

A subtracter 117 subtracts the sensor data DR(i) in the register 116 from the sensor data DL(i) in the register 113. This subtraction result is changed into an absolute value by an absolute value arithmetic unit 118. A subtraction result changed into the absolute value by the absolute value arithmetic unit 118 is integrated by an integration arithmetic unit 119.

The operations of the selectors 112 and 115 to the integration arithmetic unit 119 are repeated for a predetermined number of times. The predetermined number of times is 28 in case of the correlation arithmetic operation in the central focus detection frame 102. It is 20 in case of the correlation arithmetic operation in the left focus detection frame 101. It is 20 in case of the correlation arithmetic operation in the right focus detection frame 103.

That is, the correlation value F is obtained based on the arithmetic operation of $F=\Sigma|DL(i)-DR(i)|$ (i=1 to 28). The obtained correlation value F is stored at a storage address selected by a selector 120 of respective storage addresses in the correlation arithmetic operation result memory 22. The selector 120 selects a storage address in accordance with the current data SFT.

Subsequently, when the data SFT="2" is set, the correlation arithmetic operation between the left correlation block and the right correlation block at a second shift position from the top in FIG. 21 is carried out. Thereafter, the correlation arithmetic operation between the left correlation block and the right correlation block at each of all the shift positions from the top to the bottom in FIG. 21 is likewise repeated. Each of the obtained correlation values F is stored in the correlation arithmetic operation memory 22.

The correlation arithmetic operations in the left focus detection frame 101 and the right focus detection frame 103 are likewise executed.

An arithmetic operation time can be greatly reduced by concurrently (simultaneously) executing the correlation arithmetic operations in these central focus detection frame 102, left focus detection frame 101 and right focus detection frame 103 by the correlation arithmetic circuits 19a, 19b and 19c.

Figure 25:
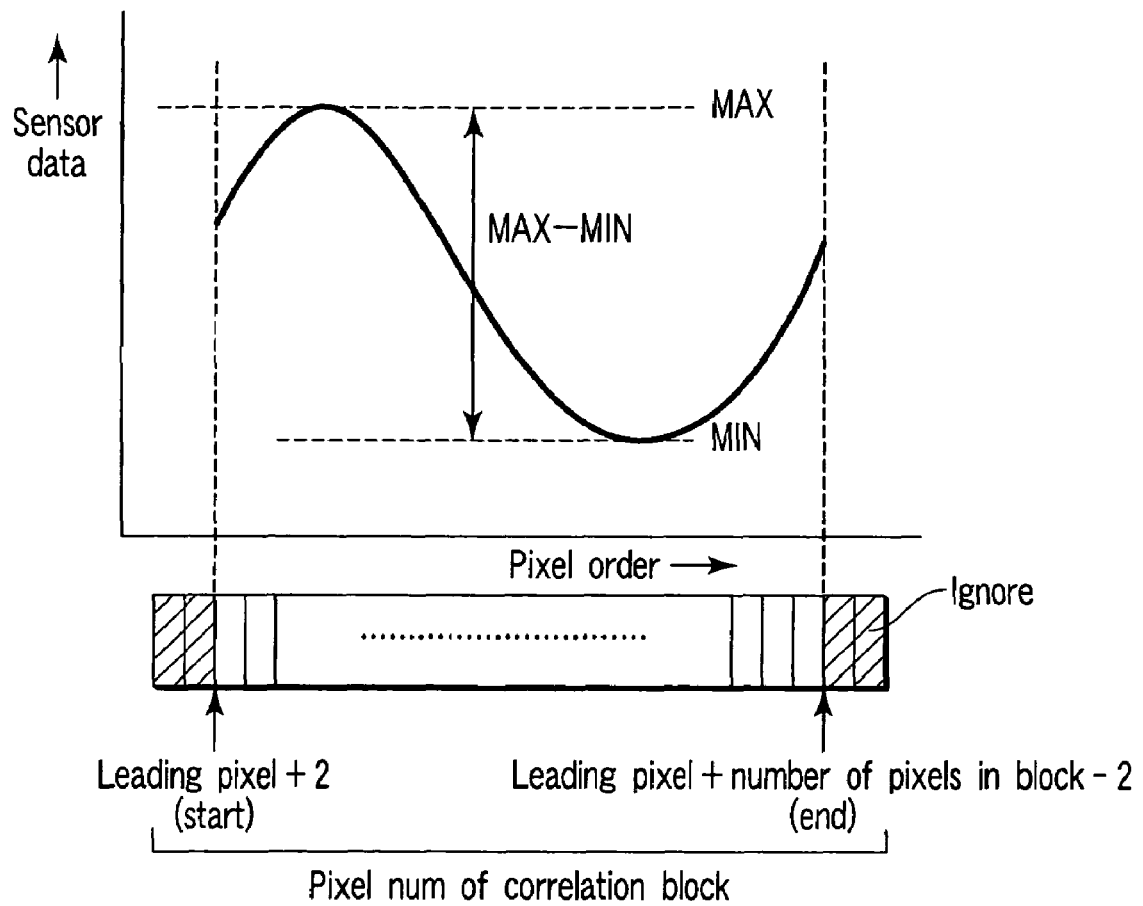
FIG. 25 is a view showing a concept of a contrast judgment in an embodiment.

FIG. 25 shows a concept of the contrast judgment.

It is necessary to make a judgment upon whether sensor data of each correlation block as an arithmetic operation target of each of the correlation arithmetic circuits 19a, 19b and 19c has sufficient contrast. That is because reliability of focus detection is lowered in sensor data of a correlation block having low contrast.

The contrast judgment circuit 21a judges whether sensor data of each correlation block as an arithmetic operation target of the correlation arithmetic circuit 19a has contrast. The contrast judgment circuit 21b judges whether sensor data of each correlation block as an arithmetic operation target of the correlation arithmetic circuit 19b has contrast. The contrast judgment circuit 21c judges whether sensor data of each correlation block as an arithmetic operation target of the correlation arithmetic circuit 19c has contrast.

As shown in FIG. 25, a difference between sensor data having a maximum value MAX and sensor data having a minimum value MIN of sensor data of respective pixels in a correlation block as a correlation arithmetic operation target is obtained as a contrast value. It is to be noted that two pixels at each of both end portions of respective pixels in a correlation block are excluded from a target of the contrast judgment. That is because sensor data of two pixels at each of both end portions obstructs the correlation arithmetic operation even if it has sufficient contrast.

If the contrast value is not less than a predetermined set value, it is determined that sufficient contrast is provided. If the contrast value is less than the predetermined set value, it is determined that the sufficient contrast is not provided.

Figure 26:
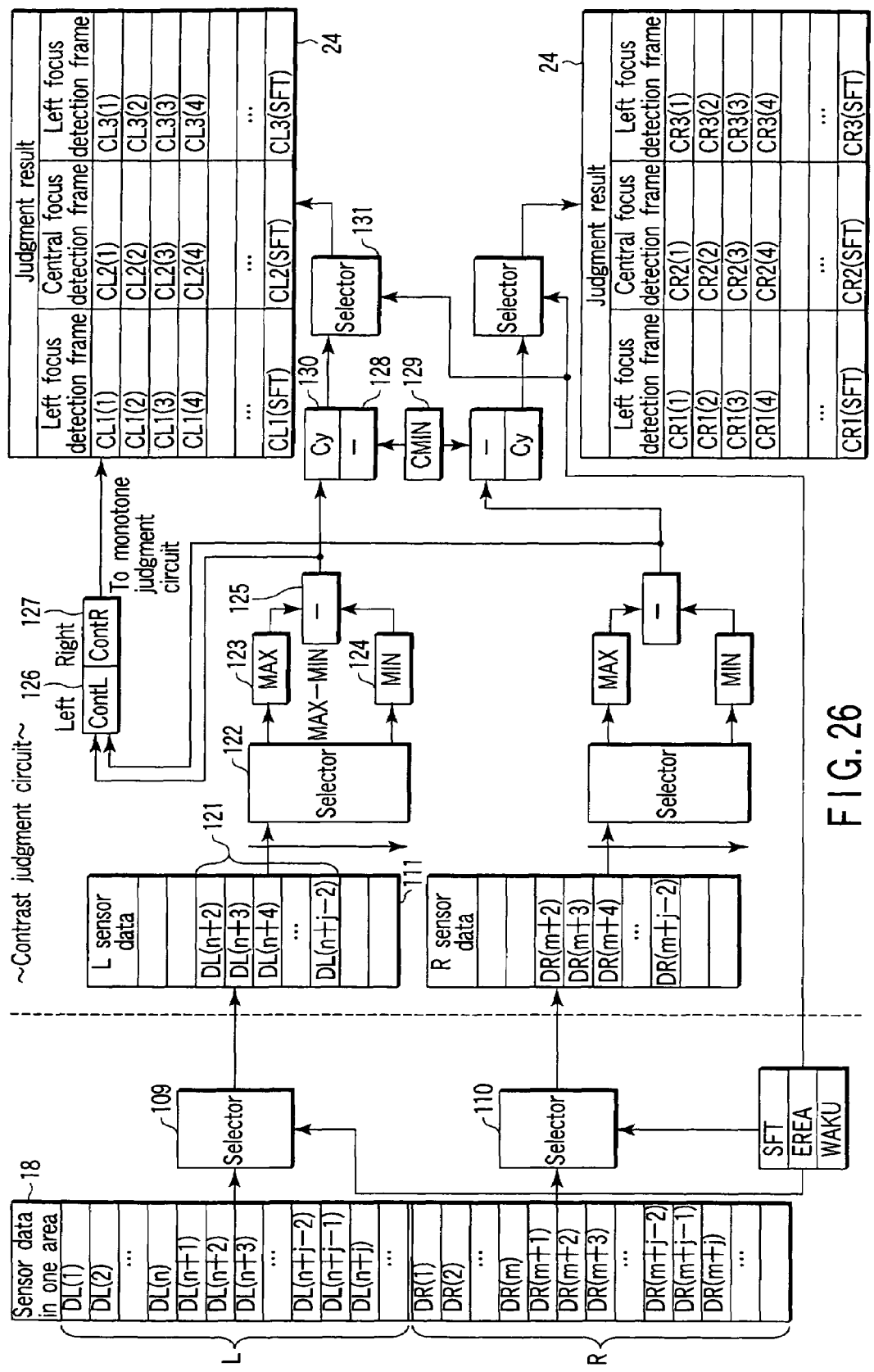
FIG. 26 is a view showing an operation of hardware of a contrast judgment circuit in an embodiment.

FIG. 26 shows operations of hardware of the contrast judgment circuits 21a, 21b and 21c.

There are the following (1) to (6) as input data, and there are the following (11) to (18) as output data. It is to be noted that k=1 to SFT.

(1) Left sensor data DL(i)

(2) Right sensor data DR(i)

(3) Data SFT representing that which pixel shown in FIGS. 16 to 18 has sensor data a target of the current contrast judgment (4) Data AREA representing that which one of the line sensors 60 to 63 outputs sensor data as a target of the current contrast judgment (5) Data WAKU representing that which one of the respective focus detection frames 101, 102 and 103 performs an arithmetic operation which is the current contrast judgment (6) A set value CMIN [a set value in the register section 5]

(11) A judgment result CL1(k) with respect to sensor data of each pixel in the left correlation block in the left focus detection frame 101

(12) A judgment result CL2(k) with respect to sensor data of each pixel in the left correlation block in the central focus detection frame 102

(13) A judgment result CL3(k) with respect to sensor data of each pixel in the left correlation block in the right focus detection frame 103

(14) A judgment result CR1(k) with respect to sensor data of each pixel in the right correlation block in the left focus detection frame 101

(15) A judgment result CR2(k) with respect to sensor data of each pixel in the right correlation block in the central focus detection frame 102

(16) A judgment result CR3(k) with respect to sensor data of each pixel in the right correlation block in the right focus detection frame 103

(17) A contrast value ContL calculated in relation to sensor data of each pixel in the left correlation block

(18) A contrast value ContR calculated in relation to sensor data of each pixel in the right correlation block The contrast judgment with respect to sensor data of each pixel in the left correlation block is basically the same as the contrast judgment with respect to sensor data of each pixel in the right correlation block. Therefore, a description will be given as to the contrast judgment with respect to sensor data of each pixel in the left correlation block alone.

The operation of the selector 109 is the same as the operation of hardware of the correlation arithmetic circuits 19a, 19b and 19c shown in FIG. 24. Two pixels at each of both end portion are excluded from the left sensor data group 111 selected by the selector 109. Additionally, of a remaining left sensor data group 121, sensor data having a maximum value MAX is selected by a maximum value detector 123 and sensor data having a minimum value MIN is selected by a minimum value detector 124.

A subtracter 125 subtracts the selected sensor data having the minimum value MIN from the selected sensor data having the maximum value MAX. This subtraction result is stored in a register 126 as a contrast value ContL (a right contrast value ContR is stored in a register 127). The contrast value ContL in the register 126 is used by the monotone judgment circuits 20a, 20b and 20c on the subsequent stage.

A subtracter 128 subtracts a set value CMIN stored in a register 129 from the contrast value ContL obtained by the subtracter 125. Sign information (carry, borrow) 130 indicative of this subtraction result is a final contrast judgment result.

A selector 131 selects a predetermined storage address in the contrast judgment result memory 24 in accordance with the fact that which pixel has sensor data which is currently processed. Further, the selector 131 stores the contrast judgment result at the selected storage address.

The above-described contrast judgments are simultaneously executed in parallel by the contrast judgment circuits 21a, 21b and 21c corresponding to the central focus detection frame 102, the left focus detection frame 101 and the right focus detection frame 103. The contrast judgment results of these contrast judgment circuits 21a, 21b and 21c are stored in different regions in the contrast judgment result memory 24.

Furthermore, each contrast judgment is executed in parallel with the correlation arithmetic operation. A time required for the contrast judgment is shorter than a time required for the correlation arithmetic operation. Therefore, there is no increase in a time lag due to execution of the contrast judgment.

Figure 27:
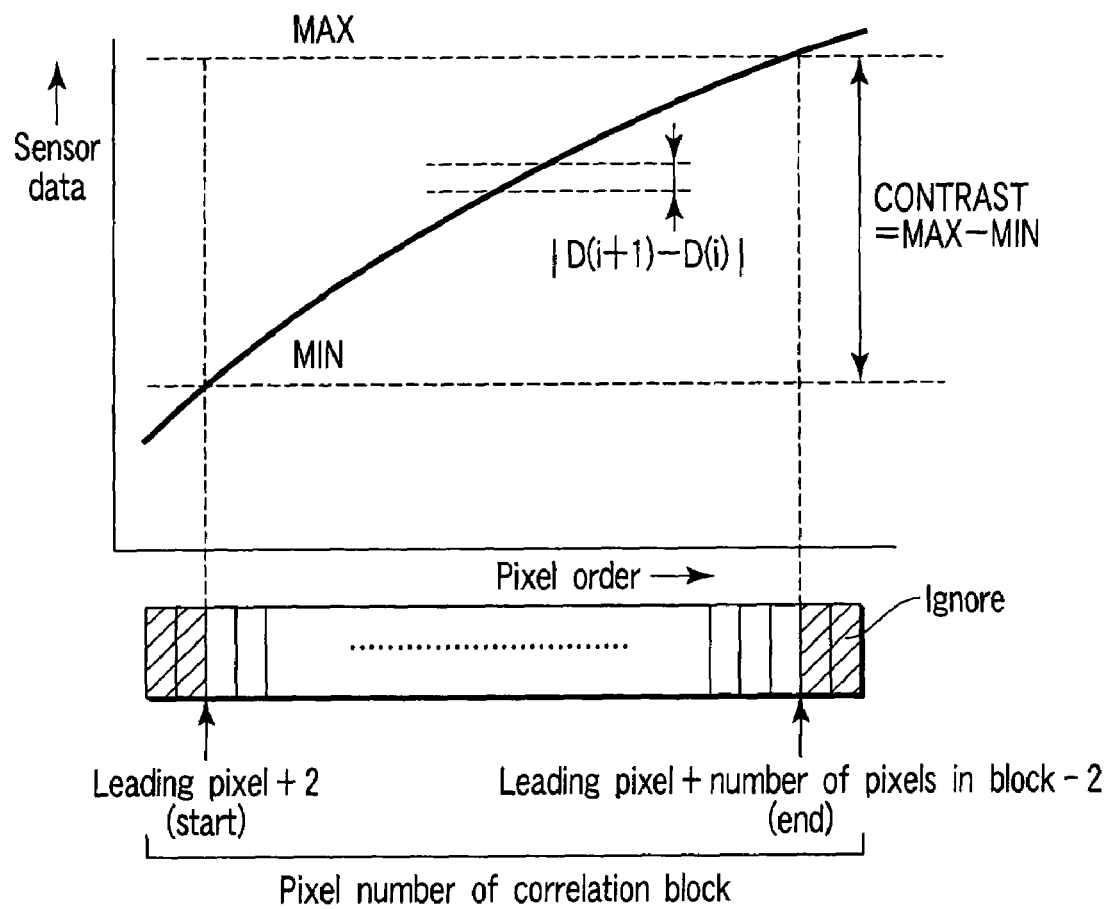
FIG. 27 is a view showing a concept of a monotone judgment in an embodiment.
Figure 28:
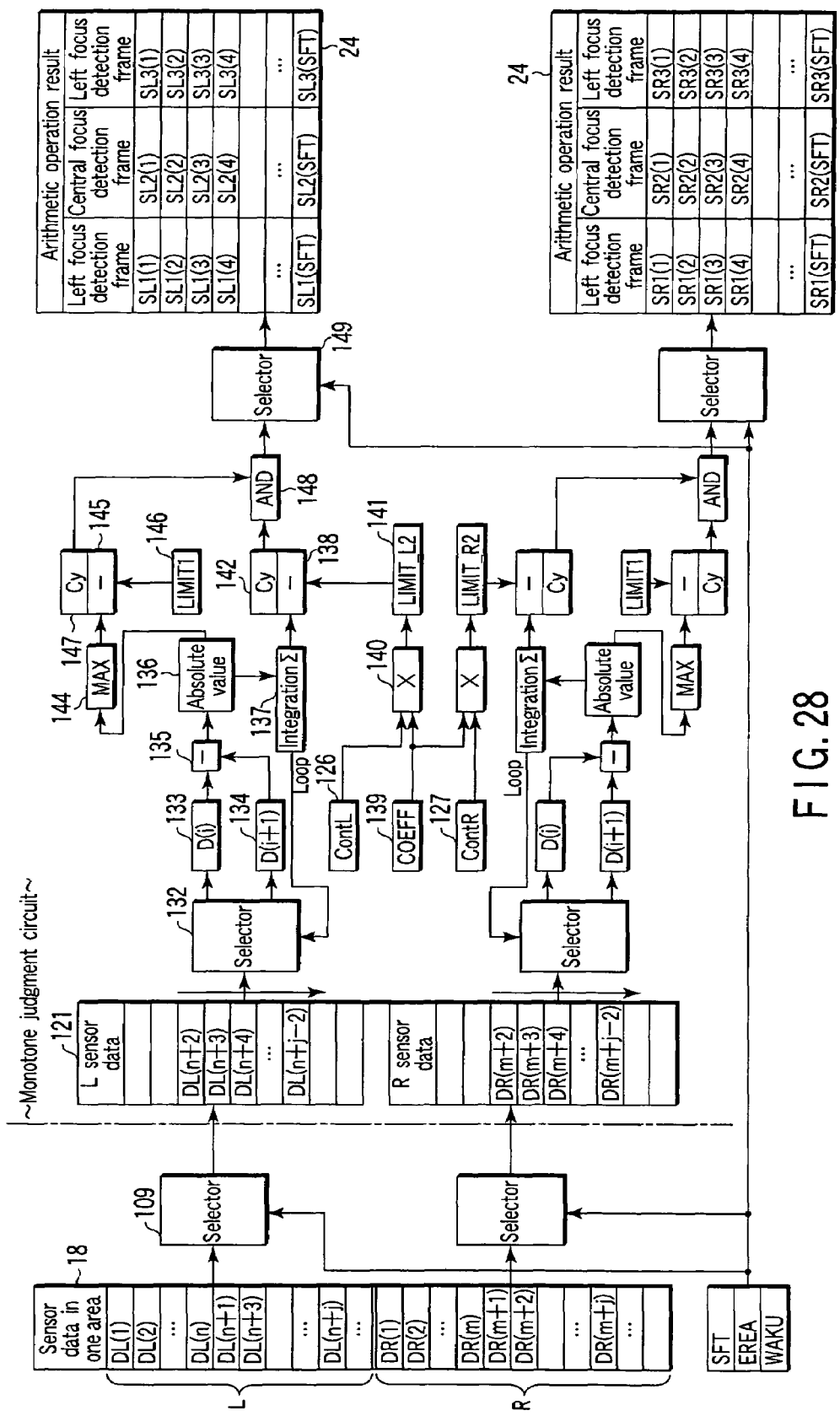
FIG. 28 is a view showing operation of hardware of a monotone judgment circuit in an embodiment.

FIG. 27 shows a concept of the monotone judgment.

It is necessary to judge whether sensor data in each correlation block monotonously increases or decreases. That is because sensor data which does not monotonously increases or decreases has low reliability in focus detection.

The monotone judgment circuit 20a judges whether sensor data of each correlation block as an arithmetic operation target of the correlation arithmetic circuit 19a monotonously increases or decreases. The monotone judgment circuit 20b judges whether sensor data of each correlation block as an arithmetic operation target of the correlation arithmetic circuit 19b monotonously increases or decrease. The monotone judgment circuit 20c judges whether sensor data of each correlation block as an arithmetic operation target of the correlation arithmetic circuit 19c monotonously increases or decreases.

As shown in FIG. 27, of sensor data of respective pixels in a correlation block as a correlation arithmetic operation target, a difference between sensor data having a maximum value MAX and sensor data having a minimum value MIN is a contrast value. Of respective pixels in a correlation block, two pixels at each of both end portions are excluded from a judgment target.

A sum of absolute values of sensor data of adjacent two pixels can be calculated based on the following expression.

$$\Sigma |D(i+1)-D(i)|$$

This calculation result is compared with a set value (=a contrast value×a coefficient). Furthermore, a maximum value of the calculation result is compared with a predetermined maximum judgment value.

It is determined that sensor data of each correlation block as a correlation arithmetic operation target monotonously increases or decreases (a monotonous change) if these comparison results are as follows:

$$\Sigma |D(i+1)-D(i)| \leq \text{(a contract value×a factor)}$$

The maximum value of $|D(i+1)-D(i)| \leq$ the maximum judgment value.

That is, if sensor data completely monotonously increases or decreases, the comparison result becomes $\Sigma |D(i+1)-D(i)|$ =a contrast value. Therefore, the contrast value is multiplied by the coefficient in order to give a range to the judgment to some extent.

When the maximum value of $|D(i+1)-D(i)|$ has a certain degree of contrast even if sensor data monotonously increases or decreases, highly accurate focus detection is possible. In such a case, it is not determined that the sensor data monotonously increases or decreases.

FIG. 27 shows an operation of hardware of the monotone judgment circuits 20a, 20b and 20c.

There are the following (1) to (8) as input data, and there are the following (11) to (16) as output data. It is to be noted that k=1 to SFT (1) Left sensor data DL(i)

(2) Right sensor data DR(i)

(3) Data SFT representing that which pixel shown in FIGS. 16 to 18 has sensor data as a target of the current contrast judgment (4) Data AREA representing that which one of the line sensors 60 to 63 outputs sensor data as a target of the current contrast judgment (5) Data WAKU representing that which one of the respective focus detection frames 101, 102 and 103 performs an arithmetic operation as the current contrast judgment (6) A monotone judgment value LIMIT1 [a set value in the register section 5]

(7) A monotone judgment coefficient COEFF [a set value in the register section 5]

(8) Contrast values ContL and ContR

(11) A judgment result SL1 (k) with respect to sensor data of each pixel in the left correlation block in the left focus detection frame 101

(12) A judgment result SL2 (k) with respect to sensor data of each pixel in the left correlation block in the central focus detection frame 102

(13) A judgment result SL (k) with respect to sensor data of each pixel in the left correlation block in the right focus detection frame 103

(14) A judgment result SR1 (k) with respect to sensor data of each pixel in the right correlation block in the left focus detection frame 101

(15) A judgment result SR2 (k) with respect to sensor data of each pixel in the right correlation block in the central focus detection frame 102

(16) A judgment result SR3 (k) with respect to sensor data of each pixel in the right correlation block in the right focus detection frame 103

The monotone judgment with respect to sensor data of each pixel in the left correlation block is basically the same as the monotone judgment with respect to sensor data of each pixel in the right correlation block. Therefore, a description will be given as to the monotone judgment with respect to sensor data of each pixel in the left correlation block alone.

The operation of the selector 109 is the same as the operation of hardware of each of the correlation arithmetic circuits 19a, 19b and 19c shown in FIG. 24. Two pixels at each of both end portions are excluded from the left sensor data group selected by the selector 109. Further, the monotone judgment is made with respect to the remaining left sensor data group 122. The operation described thus far is the same as that of each of the contrast judgment circuits 21a, 21b and 21c.

A selector 132 selects sensor data of one pixel from the left sensor data group 122, stores it in a register 133, further selects sensor data of a pixel adjacent to this pixel and stores it in a register 134.

A subtracter 135 subtracts the sensor data in the register 134 from the sensor data in the register 133. This subtraction result is changed into an absolute value by an absolute value arithmetic unit 136. The subtraction result changed into an absolute value is integrated by an integration arithmetic unit 137.

The operations of the selector 132 to the integration arithmetic unit 137 are repeated for a predetermined number of times. The predetermined number of times is 23 in case of the correlation arithmetic operation in the central focus detection frame 102. It is 15 in case of the correlation arithmetic operation in the left focus detection frame 101. It is 15 in case of the correlation arithmetic operation in the right focus detection frame 103.

That is, an arithmetic operation of $\Sigma|DL(i)-DL(i+1)|$ is carried out, and its arithmetic operation result is used in an arithmetic operation of a subtracter 138.

The contrast value ContL stored in the register 126 is multiplied by the monotone judgment coefficient COEFF stored in a judgment coefficient storage register 139 by a multiplier 140. The monotone judgment coefficient COEFF has an integer section consisting of one bit and a decimal section consisting of eight bits. A multiplication result of the multiplier 140 is stored in a register 141 as a judgment value LIMIT_L2.

The subtracter 138 subtracts the judgment value LIMIT_L2 in the register 141 from contents of the integration arithmetic unit 137. Sign information (carry, borrow) 142 indicative of this subtraction result is one of the monotone judgment results. This monotone judgment result is supplied to an AND arithmetic unit 148.

A maximum value of subtraction results changed into absolute values by the absolute value arithmetic unit 136 is detected by a maximum value detector 144. A subtracter 145 subtracts a monotone judgment value LIMIT1 stored in a register 146 from a detection result of the maximum value detector 144. Sign information (carry, borrow) 147 indicative of this subtraction result is one of monotone judgment results. This is one of results of the monotone judgment circuits 20a, 20b and 20c, and this monotone judgment result is supplied to the AND arithmetic unit 148.

The AND arithmetic unit 148 calculates AND of the sign information 142 and the sign information 147, and this becomes a final monotone judgment result.

With such a configuration, if the condition of "$\Sigma|D(i+1)-D(i)|\leq$(a contrast value×a coefficient)" is satisfied and the condition of "the maximum value of $|D(i+1)-D(i)|\leq$the maximum judgment value" is met, it is determined that sensor data monotonously increases or decreases (a monotonous change).

A selector 149 selects a predetermined storage address in the monotone judgment result memory 23 in accordance with a pixel which has currently processed sensor data. Furthermore, the selector 149 stores the final monotone judgment result at the selected storage address.

The above-described monotone judgments are simultaneously executed in parallel by the monotone judgment circuits 20a, 20b and 20c corresponding to the central focus detection frame 102, the left focus detection frame 101 and the right focus detection frame 103. The monotone judgment results of these monotone judgment circuits 20a, 20b and 20c are stored in different regions in the monotone judgment result memory 23.

With that, all the arithmetic operations by hardware are completed. At this time, as described above in conjunction with FIG. 8, an interrupt signal informing end of the arithmetic operations is supplied to the AF control section 1. Upon receiving the interrupt signal, the AF control section 1 executes the following arithmetic operation of the third AF arithmetic section 13.

Figure 29:
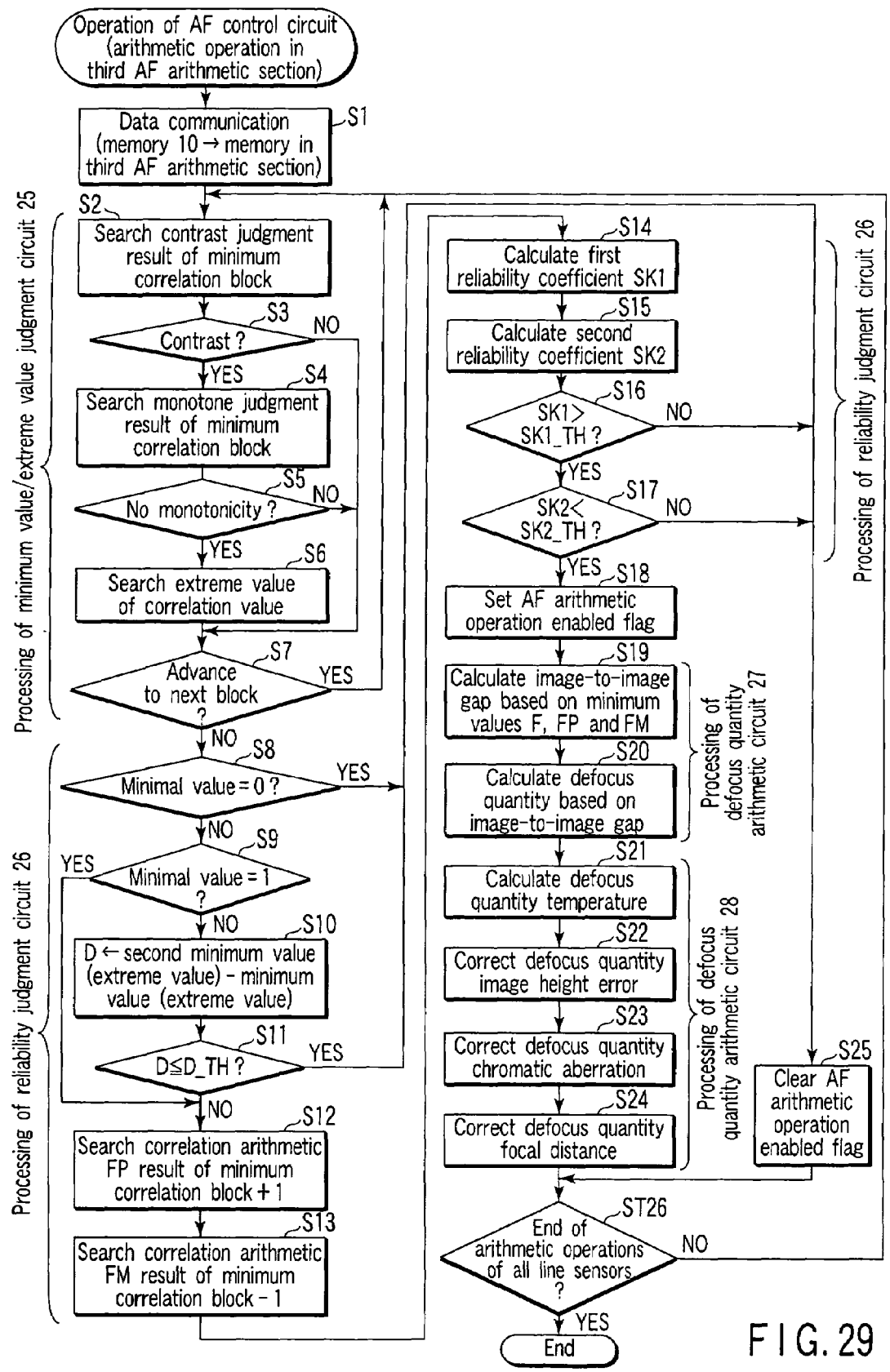
FIG. 29 is a flowchart showing an arithmetic operation of a third AF arithmetic section in an embodiment.

FIG. 29 is a flowchart showing the arithmetic operation of the third AF arithmetic section 13.

As described above with reference to FIG. 8, a step S1 is a step which transfers an arithmetic operation result stored in the memory 10 to a memory (not shown) in the third AF arithmetic section 13 of the AF control section 1 through the serial communicating section 4.

Then, repeating steps S2 to S7 can obtain a relationship between a shift number (indicative of which pixel has sensor data which is currently processed) and a correlation value F. The steps S2 to S7 are repeated from start of the arithmetic operation concerning each correlation block at an uppermost shift position shown in FIGS. 21 to 23 to end of the arithmetic operation concerning each correlation block at a lowermost shift position depicted in FIGS. 21 to 23, thereby obtaining characteristics of the shift number and the correlation value F.

At the steps S2 and S3, whether sensor data of each correlation block has contrast is judged from a contrast judgment result transferred to the memory (not shown) in the third AF arithmetic section 13. When it is determined that there is no contrast, a routine advances to the step S7.

At the steps S4 and S5, whether sensor data of each correlation block monotonously increases or decreases is judged from a monotone judgment result transferred to the memory (not shown) in the third AF arithmetic section 13. When it is determined that the sensor data monotonously increases or decreases, the routine advances to the step S7.

At the step S6, an extreme value (a minimum value) and its point of the correlation value F of the correlation arithmetic operation result 22 are obtained with respect to each correlation block whose sensor data has contrast and does not monotonously increases or decreases. This will be described with reference to FIGS. 30 to 34.

At the step S7, a judgment is made upon whether the steps S2 to S7 are repeated from start of the arithmetic operation concerning each correlation block at an uppermost shift position shown in FIGS. 21 to 23 to end of the arithmetic operation concerning each correlation block at a lowermost shift position depicted in FIGS. 21 to 23. If the arithmetic operation concerning each correlation block at the lowermost shift position has not been terminated yet, the routine jumps to the step S2.

The above-described operation corresponds to an operation of the minimum value/extreme value judgment circuit 25.

As described above, a relationship between the shift number and the correlation value F can be obtained by the steps S2 to S7. This relationship between the shift number and the correlation value F will now be described with reference to FIGS. 30 to 34.

In each of FIGS. 30 to 34, a vertical axis represents the correlation value F and a horizontal axis represents the shift number.

Figure 30:
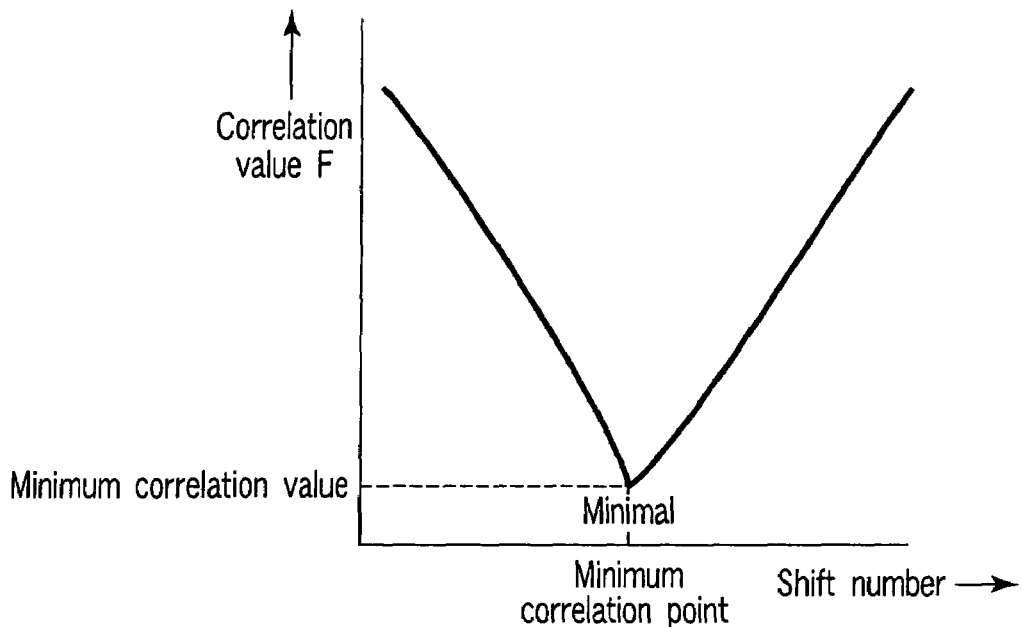
FIG. 30 is a view showing how to obtain an extreme value (a minimum value) of a correlation value and its point of a correlation arithmetic operation result in an embodiment.
Figure 31:
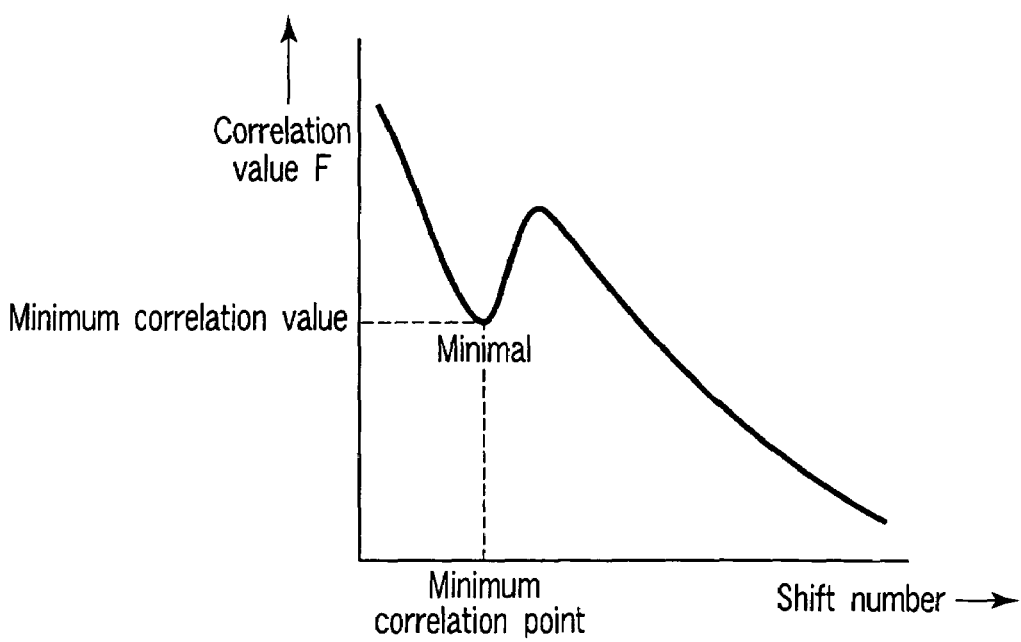
FIG. 31 is a view showing how to obtain an extreme value (a minimum value) of a correlation value and its point of a correlation arithmetic operation result in an embodiment.

As shown in FIG. 30, usually, a minimal value (a minimum value) at one point exists, and the correlation value F becomes minimum in the vicinity of this point. The steps S6 in FIG. 29 is a step at which this minimal value and this point are searched. Although there is a case where the minimal value and the minimum value are different from each other as shown in FIG. 31, the minimal value is searched in such a case.

Figure 32:
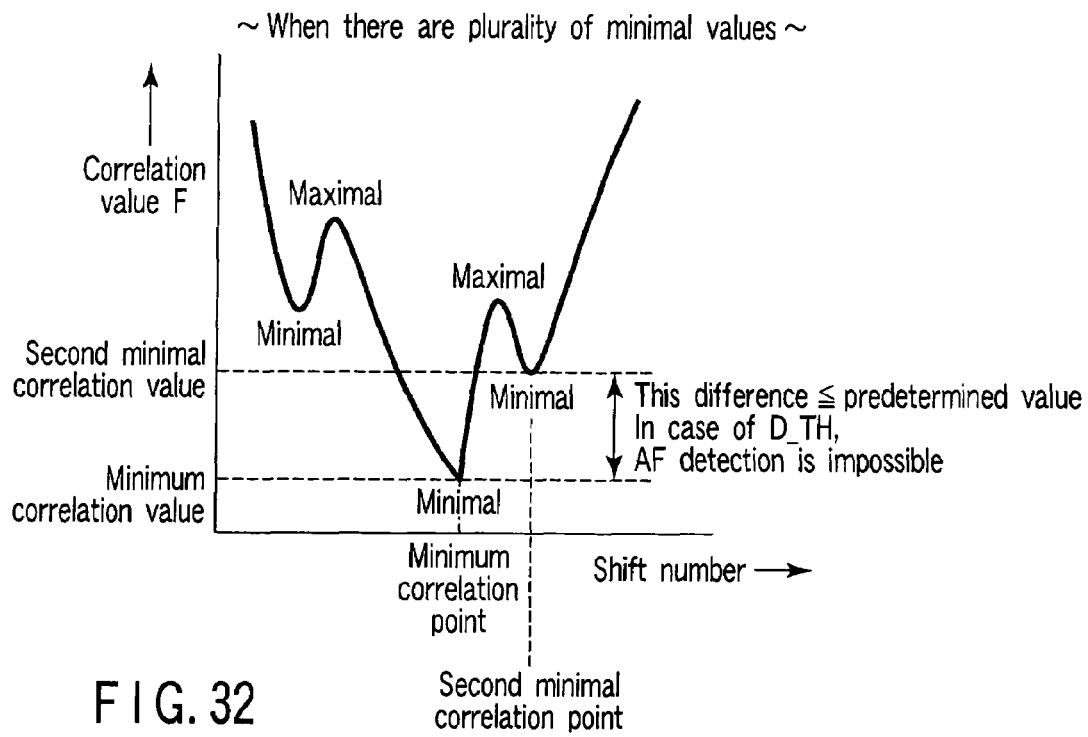
FIG. 32 is a view showing how to obtain an extreme value (a minimum value) of a correlation value and its point of a correlation arithmetic operation result in an embodiment.

As shown in FIG. 32, although there is an example in which a plurality of minimal values exist in case of an object having a repeated pattern, it is determined that focus detection is impossible when two values, i.e., the minimum value and the second minimal value are searched and a difference between these values is not greater than a threshold value D_TH. When a difference between these values is greater than the threshold value D_TH, it is determined that focus detection is possible.

Figure 33:
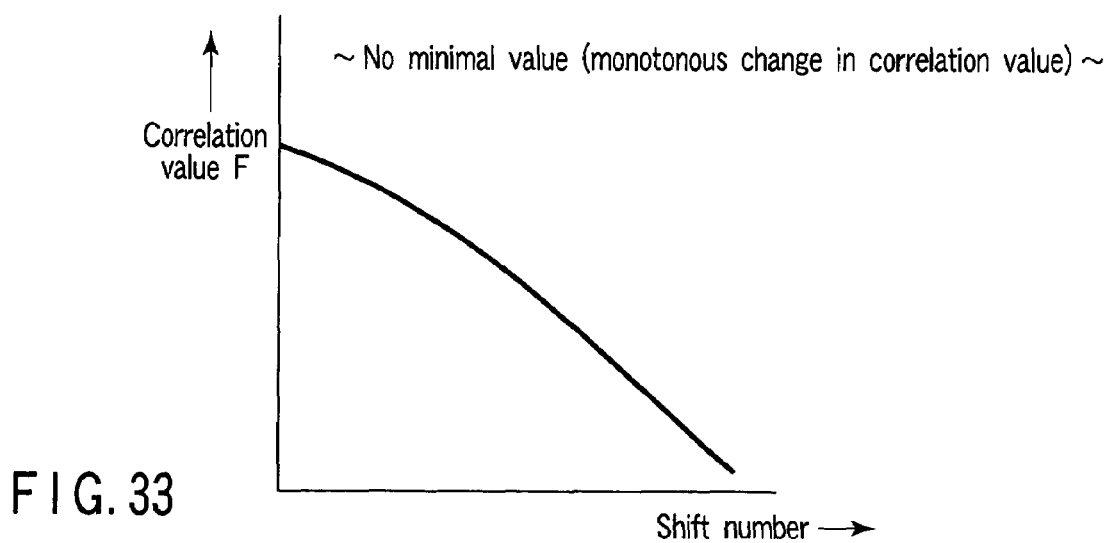
FIG. 33 is a view showing how to obtain an extreme value (a minimum value) of a correlation value and its point of a correlation arithmetic operation result in an embodiment.

Furthermore, as shown in FIGS. 33 and 34, it is determined that focus detection is impossible when there is no minimal value.

In FIG. 29, a judgment is made upon whether the minimal value=0 at a step S8. If the minimal value=0, the correlation value F has such characteristics as described in conjunction with FIGS. 33 and 34. In such a case, since focus detection is impossible, the routine jumps to a step S25, and a predetermined AF arithmetic operation enabled flag is cleared.

At a step S9, whether the maximal value=1 is judged. As described in conjunction with FIG. 30, usually, the maximal value=1. When the number of the maximal value is one, the routine advances to a step S12.

At a step S10, a difference D between a second smallest maximal correlation value and a minimum correlation value is calculated when the maximal value≧2 as described with reference to FIG. 32.

At a step S11, whether the calculated difference D is not greater than the threshold value D_TH is judged. When the difference D is not greater than the threshold value, focus detection is impossible, and hence the routine advances to the step S25.

Next, if it is not determined that focus detection is impossible, a calculation and a judgment of a reliability coefficient are performed. Prior to these operations, correlation values of respective correlation blocks adjacent to a correlation block point representing the minimum correlation value on both sides are obtained.

At a step S12, a correlation value of each correlation block (each correlation block at the next superior shift position in FIGS. 21 to 23) having a larger shift amount corresponding to one pixel than each correlation block demonstrating the minimum correlation value is read from the memory. The read correlation value is determined as FP.

At a step S13, a correlation value of each correlation block (each correlation block at the next inferior shift position in FIGS. 21 to 23) having a smaller shift amount corresponding to one pixel than each correlation block demonstrating the minimum correlation value is read from the memory. The read correlation value is determined as FM.

At a step S14, a first reliability coefficient SK1 is calculated based on the following expression in accordance with results of the steps S12 and S13.

(1) When FM>FP, the first reliability coefficient $SK1=FM-FMIN$ (2) When FM≦FP, the first reliability coefficient $SK1=FP-FMIN$ where FMIN is the minimum correlation value.

At a step 15, a second reliability coefficient SK2 is calculated based on the following expression in accordance with results of the steps S12, S13 and S14.

(1) When FM>FP, $SK2=(FMIN+FP)/SK1$ (2) When FM≦FP, $SK2=(FMIN+FM)/SK1$

At a step S16, whether SK1 is larger than a reliability threshold SK1_TH (stored in a non-illustrated memory) is judged. When SK1 is smaller than SK1_TH, sensor data is not reliable, and hence it is determined that focus detection is impossible, and the routine jumps to the step S25.

At a step S17, whether SK2 is smaller than a reliability threshold SK2_TH (stored in a non-illustrated memory) is judged. When SK2 is larger than SK2_TH, sensor data is not reliable, and hence it is determined that focus detection is impossible, and the routine advances to the step S25.

As described above, the steps S8 to S17 correspond to the operation of the reliability judgment circuit 26.

At a step S18, since the AF arithmetic operation is enabled by the processed executed thus far, a predetermined AF arithmetic operation enabled flag is set. This flag indicates whether the AF arithmetic operation is possible, and it exists with respect to all the line sensors.

At a step S19, an image-to-image gap ZR is calculated based on the following expression in accordance with data FMIN, FP and MF. As described above in conjunction with FIG. 5, the image-to-image gap is a gap between an image formed on the sensor array 55A and an image formed on the sensor array 55B.

(1) When FM>FP, $ZR=$(a shift amount of each correlation block)$+[(FM-FP)/SK1]/2$ (2) When FM≦FP, $ZR=$(a shift amount of each correlation block)$-[(FP-FM)/SK1]/2$ Here, the shift amount of each correlation block is a shift amount of each correlation block at a shift position where the correlation value F becomes minimum among the respective correlation blocks at the respective shift positions.

That is, effecting this arithmetic operation can obtain a shift number with which a true minimum correlation value F is provided rather than a shift number with which a discrete correlation value F is provided at one pixel pitch (see FIG. 35).

A defocus quantity DF of the shooting lens 50 can be obtained based on the image-to-image gap acquired at the steps S20 and S19.

Sensor surface shift amount=image-to-image gap
ZR−reference image-to-image gap ZR0

$DF=$coefficient $B/$(coefficient $A-$sensor surface shift amount)$-$coefficient $C$ In this expression, the reference image-to-image gap ZR0 means an image-to-image gap when the shooting lens 50 is in a focused state and is a value inherent to each camera body, and hence it is adjusted in a manufacturing process in a factory and stored in a non-illustrated memory.

The coefficients A to C are constants which are optically determined in accordance with characteristics of the AF optical system 39, and they are such coefficients that the vicinity of focusing can be accurately approximated (stored in a non-illustrated memory).

As described above, the steps S18 to S20 correspond to the operation of the defocus quantity arithmetic circuit 27.

At a step S21, a change in the defocus quantity due to a temperature is corrected. In general, since the AF optical system 39 varies due to a temperature, the defocus quantity D to be detected also changes due to a temperature. A non-illustrated temperature sensor is arranged in the vicinity of the AF optical system 39, and a correction quantity corresponding to a difference between a temperature detected by the temperature sensor and a reference temperature (a temperature when adjusting the image-to-image gap) is added to the defocus quantity D.

At a step S22, a component of an image height error is corrected. The image height error is generated at a position on each of the sensor arrays 55A and 55B, and affects the defocus quantity D. That is, there is a difference between the defocus quantity D detected by the central focus detection frame 102 and the defocus quantity D detected by the left focus detection frame 101 or the right focus detection frame 103 at the end portion. This difference is corrected.

At a step S23, a difference (a chromatic aberration) in the defocus quantity D due to a light source is corrected. A correction value is obtained in accordance with each light source based on an output from a non-illustrated light source sensor, and then correction is carried out.

At a step S24, since the defocus quantity D differs depending on a focal distance of the shooting lens 50, this is corrected. Adjustment of the reference image-to-image gap in a factory is carried out with respect to a given focal distance. Since the reference image-to-image gap slightly differs depending on each focal distance, this must be corrected. A correction value according to a focal distance is supplied as lens data from the lens CPU 33 to the CPU 41. Correction is effected based on the lens data.

As described above, the steps S21 to S24 correspond to the operation of the defocus quantity correction circuit 28. The arithmetic operation in third AF arithmetic section 13 has less repeated arithmetic operations but many judgment branches, and hence it is not suitable for the arithmetic operation using hardware. Moreover, in particular, it is often the case that a correction specification of the defocus correction circuit 28 involves the lens data and is thus changed later. Therefore, an arithmetic operation using a microcomputer is suitable for the arithmetic operation in the third AF arithmetic section 13.

As described above, the predetermined AF arithmetic operation enabled flag is cleared when the AF detection is impossible at the step S25, and the routine advances to a step S26.

At the step S26, since the above-described arithmetic operations are carried out with respect to all the line sensors, the routine returns to the step S2 when the arithmetic operations are not performed with respect to any line sensor.

Thus, the arithmetic operation in the third AF arithmetic section 13 is terminated, the AF detection enabled flag is obtained as an output in accordance with each line sensor, and the corrected defocus quantity is acquired when detection is possible.

The AF control section 1 determines a line sensor to be finally selected based on such information by using a predetermined algorithm, and supplies the corrected defocus quantity D of each of these line sensors to the lens CPU 33. The lens CPU 33 drives and controls the focus lens 31 based on the received defocus quantity D, thereby obtaining a focused state.

As described above, an output from the multi AF sensor 3 is converted into a digital signal, this converted output is stored in the memory section 14, stored contents of this memory section 14 are simultaneously acquired in a plurality of types of arithmetic sections in the second AF arithmetic section 11, and the focus detection arithmetic operations are concurrently executed in the respective arithmetic sections. Therefore, a time required for the arithmetic operations can be greatly reduced, whereby a circuit scale can be decreased. Additionally, since the arithmetic sections whose specifications are not possibly changed are configured by using hardware, thereby increasing a speed of the arithmetic operation processing.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general invention concept as defined by the appended claims and their equivalents.

What is claimed is:

1. A focus detection apparatus comprising:
an auto focus sensor which receives light reflected from an object at a plurality of light receiving sections and photoelectrically converts the received light;
a converting section which converts sensor data output from each of the light receiving sections into a digital signal;
a memory section which stores digital data of the digital signal corresponding to each sensor data converted by the converting section;
a plurality of arithmetic sections which concurrently execute a plurality of types of arithmetic operations which determine a focal point of the digital data corresponding to each sensor data stored in the memory section; and
a control section which adjusts the focal point determined by the arithmetic operation result of each of the arithmetic sections,
wherein the auto focus sensor has a plurality of line sensors, each of the line sensors having both a first light receiving section including a column of photoelectric conversion elements and a second light receiving section including a column of photoelectric conversion elements,
wherein the converting section is provided in accordance with each line sensor, and
wherein multiple sets of the plurality of arithmetic sections are provided in accordance with each line sensor.

2. An apparatus according to claim 1, wherein one of the plurality of arithmetic sections calculates a correlation degree of sensor data corresponding to an output from the first light receiving section and sensor data corresponding to the second light receiving section.

3. An apparatus according to claim 1, wherein the memory section concurrently outputs each sensor data stored therein to the plurality of arithmetic sections.

4. An apparatus according to claim 1, wherein the memory section sequentially overwrites and stores each sensor data converted by the converting section.

5. An apparatus according to claim 1, wherein the memory section is a flip flop.

6. An apparatus according to claim 1, wherein a plurality of focus detection frames are set on the light receiving sections, and
wherein the plurality of arithmetic sections execute respective arithmetic operations in accordance with the focus detection frames.

7. An apparatus according to claim 6, wherein the plurality of arithmetic sections have a plurality of arithmetic circuits as means for executing respective arithmetic operations in accordance with the focus detection frames.

8. An apparatus according to claim 7, wherein the respective arithmetic circuits concurrently execute respective arithmetic operations.

9. An apparatus according to claim 1, wherein a plurality of focus detection frames are set on the light receiving sections, and
wherein the plurality of arithmetic sections concurrently execute respective arithmetic operations in accordance with the focus detection frames.

10. An apparatus according to claim 1, wherein the plurality of light receiving sections are constituted of hardware.

11. An apparatus according to claim 1, wherein the plurality of arithmetic sections include a correlation arithmetic section, a monotone judgment section and a contrast judgment section, the correlation arithmetic section calculating a correlation degree of sensor data corresponding to an output from the first light receiving section and sensor data corresponding to the second light receiving section, the monotone judgment section judging whether each sensor data as a target of an arithmetic operation of the correlation arithmetic section monotonously increases or decreases, and the contrast judgment section judging whether each sensor data as a target of the arithmetic operation of the correlation arithmetic section has contrast.

* * * * *